US011367870B2

(12) United States Patent
Chen et al.

(10) Patent No.: US 11,367,870 B2
(45) Date of Patent: Jun. 21, 2022

(54) ULTRASTABLE RECHARGEABLE MANGANESE BATTERY WITH SOLID-LIQUID-GAS REACTIONS

(71) Applicant: The Board of Trustees of the Leland Stanford Junior University, Stanford, CA (US)

(72) Inventors: Wei Chen, Stanford, CA (US); Yi Cui, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 84 days.

(21) Appl. No.: 16/611,253

(22) PCT Filed: May 29, 2018

(86) PCT No.: PCT/US2018/034919
§ 371 (c)(1),
(2) Date: Nov. 6, 2019

(87) PCT Pub. No.: WO2018/222609
PCT Pub. Date: Dec. 6, 2018

(65) Prior Publication Data
US 2020/0161649 A1    May 21, 2020

Related U.S. Application Data

(60) Provisional application No. 62/513,373, filed on May 31, 2017.

(51) Int. Cl.
| | |
|---|---|
| *H01M 4/00* | (2006.01) |
| *H01M 4/50* | (2010.01) |
| *H01M 4/66* | (2006.01) |
| *H01M 4/92* | (2006.01) |

(52) U.S. Cl.
CPC ............ *H01M 4/50* (2013.01); *H01M 4/663* (2013.01); *H01M 4/926* (2013.01); *H01M 2300/0005* (2013.01); *H01M 2300/0017* (2013.01)

(58) Field of Classification Search
CPC .................. H01M 4/50; H01M 4/663; H01M 2300/0017; H01M 4/926
See application file for complete search history.

(56) References Cited

U.S. PATENT DOCUMENTS

| | | | |
|---|---|---|---|
| 3,669,744 A | 6/1972 | Tsenter et al. | |
| 3,867,199 A | 2/1975 | Dunlop et al. | |
| 4,159,367 A | 6/1979 | Heinz et al. | |
| 6,183,718 B1* | 2/2001 | Barker | H01M 4/62 423/599 |
| 7,943,249 B2 | 5/2011 | Kawazoe et al. | |
| 2002/0025472 A1 | 2/2002 | Komori et al. | |
| 2011/0318656 A1* | 12/2011 | Hago | C01B 35/127 429/405 |
| 2015/0010833 A1 | 1/2015 | Amendola et al. | |
| 2015/0287988 A1* | 10/2015 | Xu | H01M 4/366 429/188 |
| 2015/0311503 A1 | 10/2015 | Ingale et al. | |
| 2016/0190547 A1* | 6/2016 | Schweiss | D21H 13/50 429/2 |

FOREIGN PATENT DOCUMENTS

| | | |
|---|---|---|
| CN | 105390697 A | 3/2016 |
| JP | 2012-092345 A | 5/2012 |
| KR | 20130112971 A | 10/2013 |
| KR | 10-2015-0083898 A | 7/2015 |

OTHER PUBLICATIONS

Chen et al., "A manganese-hydrogen battery with potential for grid-scale energy storage", Nature Energy, vol. 3, No. 5, Apr. 30, 2018, pp. 428-436.
Extended European Search Report for EP Application No. 18810448.3 dated Mar. 1, 2021, 6 pages.
International Search Report and Written Opinion, PCT/US2018/034919, 11 pages (dated Sep. 19, 2018).
International Preliminary Report on Patentability issued in PCT Application No. PCT/US2018/034919 dated Dec. 12, 2019, 9 pages.

* cited by examiner

*Primary Examiner* — Cynthia H Kelly
*Assistant Examiner* — Monique M Wills
(74) *Attorney, Agent, or Firm* — Sheppard Mullin Richter & Hampton LLP

(57) ABSTRACT

A rechargeable manganese battery includes: (1) a first electrode including a porous, conductive support; (2) a second electrode including a catalyst support and a catalyst disposed over the catalyst support; and (3) an electrolyte disposed between the first electrode and the second electrode to support reversible precipitation and dissolution of manganese at the first electrode and reversible evolution and oxidation of hydrogen at the second electrode.

17 Claims, 31 Drawing Sheets

… (1) …

ULTRASTABLE RECHARGEABLE MANGANESE BATTERY WITH SOLID-LIQUID-GAS REACTIONS

CROSS-REFERENCE TO RELATED APPLICATION

This application is a National Stage Entry of PCT/US2018/034919, filed May 29, 2018, which claims the benefit of and priority to U.S. Provisional Application No. 62/513,373, filed May 31, 2017, the contents of which are incorporated herein by reference in their entirety.

STATEMENT REGARDING FEDERALLY SPONSORED RESEARCH OR DEVELOPMENT

This invention was made with Government support under contract DE-AC02-76SF00515 awarded by the Department of Energy. The Government has certain rights in the invention.

BACKGROUND

The ever-increasing global energy consumption has driven the development of renewable energy technologies to reduce greenhouse gas emission and air pollution. Electrochemical energy storage devices, such as batteries, are integral for implementing renewable yet intermittent sources of energy such as solar and wind. To date, different battery technologies have been deployed for energy storage. Lithium ion batteries are widely used in portable electronics, but their safety and long-term rechargeability should be significantly improved. Aqueous rechargeable batteries, as compared to their organic counterparts, have significant benefits in terms of high power output, high safety, and being environmental benign. Over the past few decades, manganese (Mn)-based aqueous batteries have been attracting remarkable attention due to their earth abundance, low cost, environmental friendliness and high theoretical capacity. State-of-the-art manganese-zinc batteries are dominant in manganese oxide-based aqueous batteries, yet they have low capacity, are poorly rechargeable, and suffer from dendrite formation on a zinc anode. The low theoretical specific capacity of the one-electron-transfer charge storage mechanism (about 308 mAh/g) coupled with severe initial capacity fading hinder the broader implementation of Mn-based batteries as high energy storage devices. At the cathode, the dissolution of a solid $MnO_2$ cathode into an electrolyte introduces parasitic losses and imparts poor reversibility to typical Mn-based cells. While various additives such as bismuth, lead, titanium and nickel-modified manganese dioxides have been demonstrated to reduce the loss of active $MnO_2$ and enhance rechargeability, their improvement on battery stability is still constrained. At the anode, unavoidable formation of zinc dendrites upon extended cycling leads to the failure of zinc-based batteries. The development of an advanced aqueous rechargeable manganese-based battery with high capacity and long cycle life is thus highly desirable.

It is against this background that a need arose to develop embodiments of this disclosure.

SUMMARY

In some embodiments, a rechargeable manganese battery includes: (1) a first electrode including a porous, conductive support; (2) a second electrode including a catalyst support and a catalyst disposed over the catalyst support; and (3) an electrolyte disposed between the first electrode and the second electrode to support reversible precipitation and dissolution of manganese at the first electrode and reversible evolution and oxidation of hydrogen at the second electrode.

In some embodiments, a rechargeable manganese battery includes: (1) a cathode including a porous, conductive support; (2) an anode including a catalyst support and a catalyst disposed over the catalyst support; and (3) an electrolyte disposed between the cathode and the anode and including manganese ions.

In some embodiments, a method of manufacturing a rechargeable manganese battery includes: (1) providing a first electrode including a porous, conductive support; (2) providing a second electrode including a catalyst support and a catalyst coated over the catalyst support; and (3) providing an electrolyte to support reversible precipitation and dissolution of manganese at the first electrode and reversible evolution and oxidation of hydrogen at the second electrode.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DESCRIPTION

Figure 35:
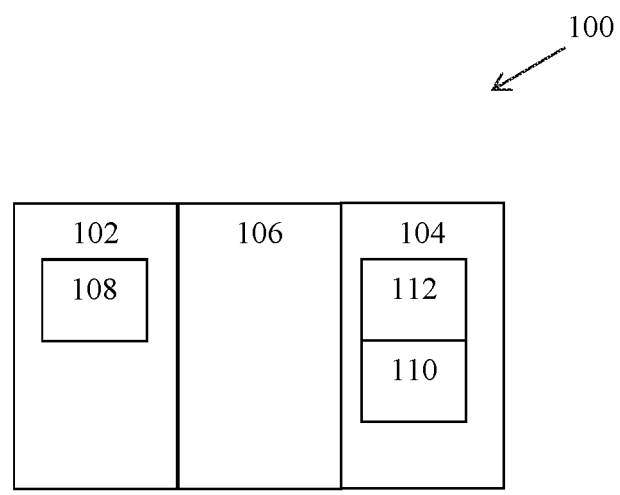
FIG. 35. Schematic of a rechargeable manganese battery according to some embodiments.

FIG. 35 shows a schematic of a rechargeable manganese battery 100 according to some embodiments. The battery 100 includes: (1) a first electrode 102 including a porous, conductive support 108; (2) a second electrode 104 including a catalyst support 110 and a catalyst 112 coated or otherwise disposed over the catalyst support 110; and (3) an electrolyte 106 disposed between the first electrode 102 and the second electrode 104 to support reversible precipitation and dissolution of manganese at the first electrode 102 and reversible evolution and oxidation of hydrogen at the second electrode 104.

In some embodiments, the first electrode 102 is a cathode, and the second electrode 104 is an anode.

In some embodiments, the porous, conductive support 108 included in the first electrode 102 is a carbonaceous fibrous support, such as carbon cloth, carbon paper, or carbon felt, although other carbonaceous or non-carbon-based fibrous supports can be used. A porosity can be represented as a ratio of a volume of voids relative to a total volume, namely between 0 and 1, or as a percentage between 0% and 100%. In some embodiments, the porous, conductive support 108 can have a porosity that is at least about 0.05 and up to about 0.95 or more, such as in the range of about 0.1 to about 0.9, about 0.2 to about 0.9, about 0.3 to about 0.9, about 0.4 to about 0.9, about 0.5 to about 0.9, about 0.5 to about 0.8, or about 0.6 to about 0.8. Techniques for determining porosity include, for example, porosimetry and optical or scanning techniques. In some embodiments and for at least one charging state of the first electrode 102 (e.g., substantially fully discharged state), the porous, conductive support 108 constitutes greater than about 50% by weight of a total weight of the first electrode 102, such as at least about 60% by weight, at least about 70% by weight, at least about 80% by weight, at least about 90% by weight, or at least about 95% by weight.

In some embodiments, the catalyst support 110 included in the second electrode 104 is a carbonaceous fibrous support, such as carbon cloth, carbon paper, or carbon felt, although other carbonaceous or non-carbon-based fibrous supports can be used. In some embodiments, the catalyst support 110 can have a porosity that is at least about 0.05 and up to about 0.95 or more, such as in the range of about 0.1 to about 0.9, about 0.2 to about 0.9, about 0.3 to about 0.9, about 0.4 to about 0.9, about 0.5 to about 0.9, about 0.5 to about 0.8, or about 0.6 to about 0.8.

In some embodiments, the catalyst 112 included in the second electrode 104 includes one or more platinum group metals, such as platinum (Pt), ruthenium (Ru), rhodium (Rh), palladium (Pd), osmium (Os), and iridium (Ir). In some embodiments, the catalyst 112 includes one or more noble metals, such as silver (Ag) and gold (Au), in place of, or in combination with, one or more platinum group metals.

In some embodiments, the catalyst 112 included in the second electrode 104 includes one or more non-noble metals and their carbides, such as tungsten carbide (e.g., WC or $W_2C$), molybdenum carbide (e.g., MoC or $Mo_2C$), and titanium carbide (e.g., TiC or $Ti_2C$). In some embodiments, the catalyst 112 includes one or more non-noble metals, such as nickel (Ni), cobalt (Co), manganese (Mn), iron (Fe), and copper (Cu), in place of, or in combination with, one or more non-noble metals and their carbides.

In some embodiments, the catalyst 112 included in the second electrode 104 includes one or more non-noble metals and their phosphides, such as nickel phosphide (e.g., NiP or $Ni_2P$), cobalt phosphide (e.g., CoP or $Co_2P$), and iron phosphide (e.g., FeP or $Fe_2P$). In some embodiments, the catalyst 112 includes one or more non-noble metals, such as manganese (Mn), copper (Cu), molybdenum (Mo), tungsten (W), and titanium (Ti), in place of, or in combination with, one or more non-noble metals and their phosphides.

In some embodiments, the catalyst 112 included in the second electrode 104 includes one or more carbonaceous materials, such as carbon black, graphitic carbon, mesoporous carbon, carbon nanofiber, carbon nanotube, and graphene. In some embodiments, the catalyst includes 112 one or more carbonaceous materials doped with one or more elements, such as nitrogen (N), sulfur (S), boron (B), and phosphorus (P).

In some embodiments, the electrolyte 106 is an aqueous electrolyte. In some embodiments, the aqueous electrolyte includes manganese ions. In some embodiments, the manganese ions include $Mn^{2+}$, although manganese ions having other oxidation states can be included. In some embodiments, a concentration of the manganese ions is in a range of about 0.1 molar (M) to about 7 M, such as about 0.1 M to about 6 M, about 0.1 M to about 5 M, about 0.1 M to about 4 M, about 0.1 M to about 3 M, about 0.1 M to about 2 M, about 0.5 M to about 2 M, or about 0.5 M to about 1.5 M. In some embodiments, the aqueous electrolyte has a pH of about 7 or below, such as about 6.5 or below, about 6 or below, about 5.5 or below, about 5 or below, about 4.5 or below, about 4 or below, about 3.5 or below, about 3 or below, about 2.5 or below, about 2 or below, or about 1.5 or below, and down to about 1 or below.

In some embodiments, the electrolyte 106 is a non-aqueous electrolyte. In some embodiments, the non-aqueous electrolyte includes manganese ions. In some embodiments, the manganese ions include $Mn^{2+}$, although manganese ions having other oxidation states can be included. In some embodiments, a concentration of the manganese ions is in a range of about 0.1 M to about 7 M, such as about 0.1 M to about 6 M, about 0.1 M to about 5 M, about 0.1 M to about 4 M, about 0.1 M to about 3 M, about 0.1 M to about 2 M, about 0.5 M to about 2 M, or about 0.5 M to about 1.5 M. In some embodiments, the non-aqueous electrolyte has a pH of about 7 or below, such as about 6.5 or below, about 6 or below, about 5.5 or below, about 5 or below, about 4.5 or below, about 4 or below, about 3.5 or below, about 3 or below, about 2.5 or below, about 2 or below, or about 1.5 or below, and down to about 1 or below.

In some embodiments, the electrolyte 106 is configured to support precipitation of manganese over the porous, conductive support 108 as manganese oxide. In some embodiments, the manganese oxide includes gamma manganese oxide. In some embodiments, the electrolyte 106 is configured to support precipitation of manganese over the porous, conductive support 108 as nanosheets or other nanostructures of manganese oxide, such as having at least one dimension in the range of about 1 nm to about 1000 nm, about 1 nm to about 900 nm, about 1 nm to about 800 nm, about 1 nm to about 700 nm, about 1 nm to about 600 nm, about 1 nm to about 500 nm, about 1 nm to about 400 nm, about 1 nm to about 300 nm, about 1 nm to about 200 nm, or about 1 nm to about 100 nm. In some embodiments, the electrolyte 106 is configured to support precipitation of manganese over the porous, conductive support 108 having an oxidation state of about 4+.

Additional embodiments are directed to a method of manufacturing or operating the rechargeable manganese battery 100, which method includes: (1) providing the first electrode 102 including the porous, conductive support 108; (2) providing the second electrode 104 including the catalyst support 110 and the catalyst 112 coated over the catalyst support 110; and (3) providing the electrolyte 106 to support reversible precipitation and dissolution of manganese at the first electrode 102 and reversible evolution and oxidation of hydrogen at the second electrode 104.

EXAMPLE

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Overview:

The development of high performance rechargeable batteries is of significance to the integration of renewable energy for applications of consumer electronics, electric vehicles and grid storage. Manganese-based batteries offer opportunities of low cost, environmental benign and high theoretical capacity. However, these batteries have suffered from low capacity and poor cycling stability due to manganese dissolution into electrolytes. This example introduces an improved battery chemistry involving solid-liquid-gas reactions, allowing an ultrafast charging, high capacity and excellently rechargeable manganese-based battery. At the cathode, manganese dioxide precipitates and dissolves reversibly, while catalytic hydrogen evolution-oxidation reactions occur at the anode in highly soluble manganese aqueous electrolytes. Experimental measurements of the manganese batteries exhibit a nearly two-electron-transfer charge storage mechanism with a reversible capacity of about 585 mAh/g and excellent rechargeability for over 10,000 cycles without noticeable decay. The manganese batteries present a well-defined discharge voltage of about 1.3 V and outstanding rate capability of about 100 C (about 36 seconds of discharge). Theoretical simulation confirms that the manganese battery is of high reversibility in the cathode manganese precipitation-dissolution charge-discharge process. Furthermore, this battery configuration can be readily scaled in different pathways for large-scale energy storage. This battery chemistry is desirable as an efficient energy storage system for low-cost, large-scale applications.

Figure 1:
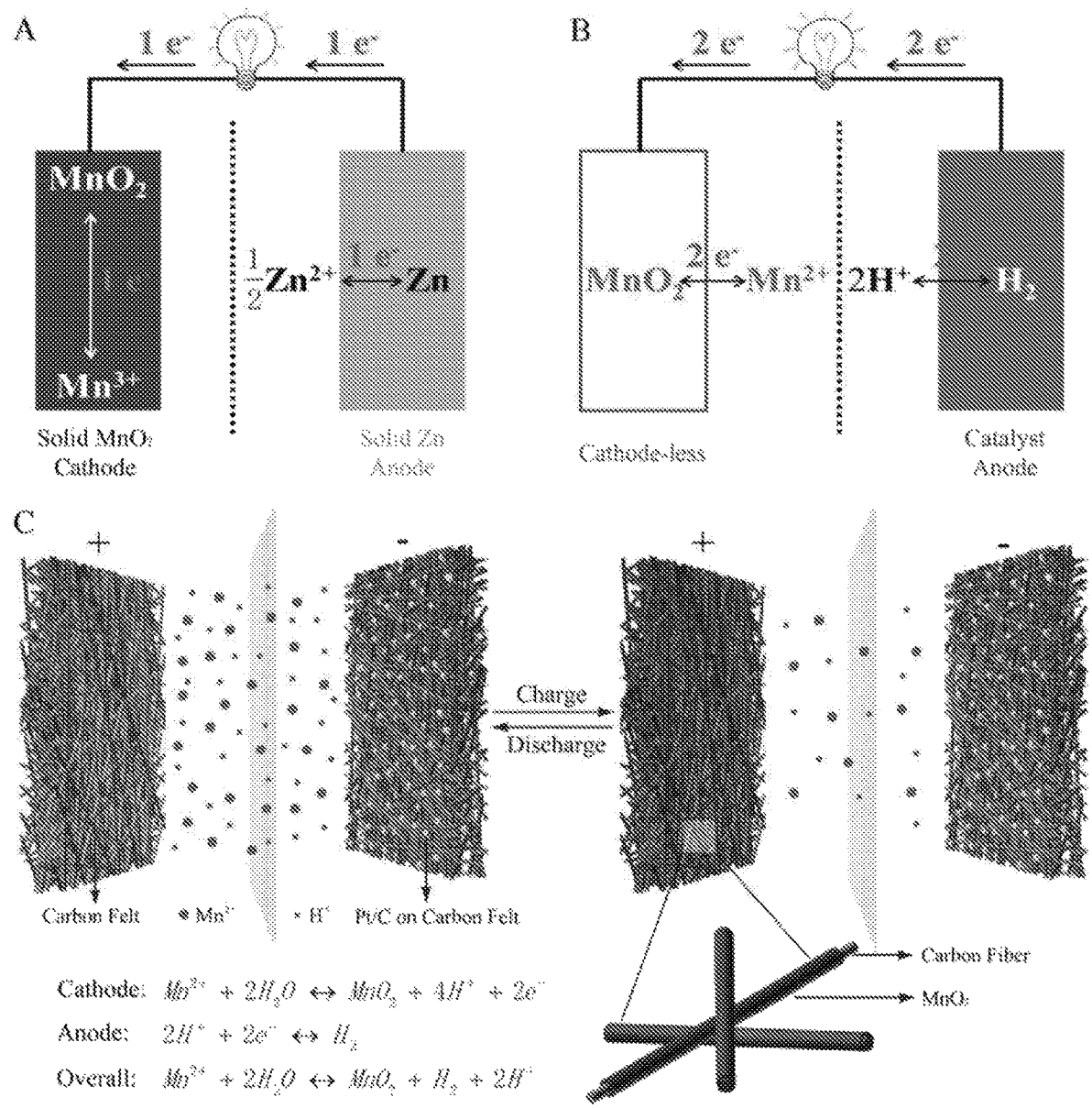
FIG. 1. Cell schematics of an improved manganese battery with two-electron-transfer charge storage mechanism. (A) Configuration of a state-of-the-art $MnO_2$—Zn battery. (B) Configuration of the improved manganese battery. (C) Schematic illustration of the cell in its charge and discharge modes. It is noted that cations ($Mn^{2+}$ and $H^+$) without anions ($SO_4^{2-}$) in an electrolyte are presented in the schematic.

Results and Discussion:

The rich chemistry of manganese allows it to exist in various valence states such as $Mn^{2-}$, $Mn^{3-}$, $Mn^{4-}$ and $Mn^{7+}$, providing opportunities for different manganese-based battery systems. In this example, an ultrastable, solid-liquid-gas reactive manganese battery (SLGMB) is proposed with a two-electron-transfer based manganese deposition-dissolution charge storage mechanism. Different from other manganese batteries including the $MnO_2$—Zn cell (FIG. 1A) which uses a solid $MnO_2$ cathode and a Zn anode, the proposed manganese battery utilizes a cathode-less electrode and a catalyst governed anode (FIG. 1B). Specifically, the SLGMB is composed of a cathode-less porous carbon felt current collector, a glass fiber separator, a Pt/C catalyst-coated carbon felt anode and a manganese ion aqueous electrolyte (FIG. 1C). Charge-discharge processes of the manganese battery involve solid-liquid manganese precipitation-dissolution reactions at the cathode and liquid-gas hydrogen evolution reaction (HER)-hydrogen oxidation reaction (HOR) at the anode. When charging the cell, soluble $Mn^{2+}$ ions in the electrolyte migrate to the cathode and deposit in the form of solid $MnO_2$ on the carbon felt, while hydrogen gas evolution from protons is driven by highly active platinum catalysts at the anode. During discharge of the battery, the uniform layer of as-deposited $MnO_2$ on the cathode is dissolved back to soluble $Mn^{2+}$ electrolyte and hydrogen is oxidized on the anode.

The proposed manganese battery has particular advantages over other manganese systems. First, advantage is taken of the manganese dissolution induced failure mechanism in other aqueous manganese batteries and is applied to the proposed manganese battery as a principal charge storage mechanism. The manganese deposition-dissolution reaction is a highly reversible process, fundamentally addressing the cathode rechargeability issue and marking a significant step towards the decades-long goal of stabilizing of manganese cathodes. Meanwhile, the manganese deposition-dissolution reaction is a two-electron-transfer governed charge-discharge process, which effectively doubles the theoretical capacity of the SLGMB compared to other Mn batteries from about 308 to about 616 mAh/g. In addition, a hydrogen electrode is used as an anode to overcome the dendrite problem of zinc anodes and is based on highly reversible Pt-catalyzed HER and HOR reactions. Moreover, by coupling the manganese cathode with the catalytic hydrogen anode, a variation of an electrolyte acidity during the charge and discharge processes can be significantly buffered by the consumption and release of protons in the electrolyte. Furthermore, the fast kinetics of the manganese precipitation-dissolution reactions at the cathode and the HER-HOR at the anode contribute to SLGMB having a high rate capability.

Figure 2:
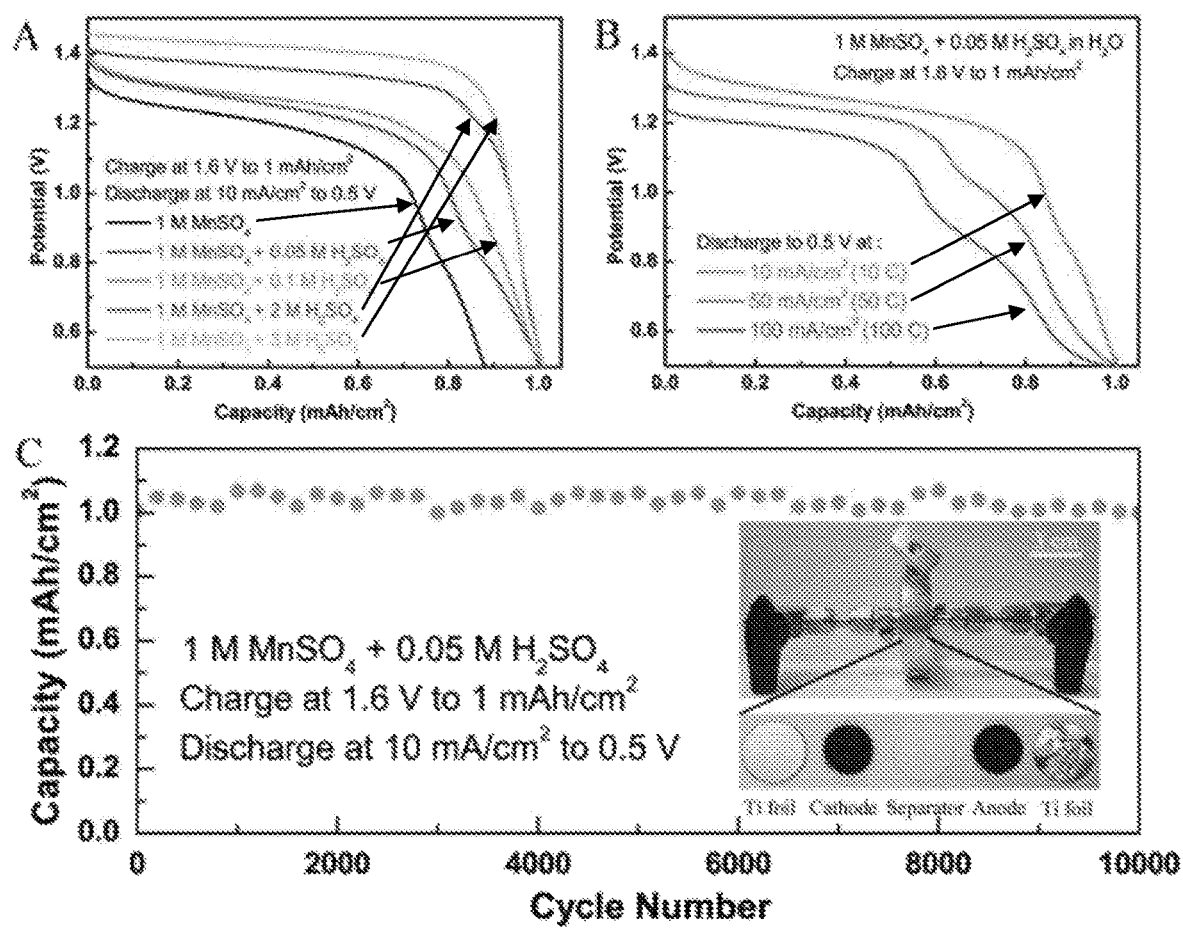
FIG. 2. Electrochemical performance of a Swagelok-type solid-liquid-gas reactive manganese battery (SLGMB). (A) Discharge behavior of the cell in about 1 M $MnSO_4$ with various acidities. (B) Rate capability and (C) Long-term stability test of the cell in an electrolyte of about 1 M MnSO4 with about 0.05 M $H_2SO_4$. All cells are tested in Swagelok-type devices, which are charged at about 1.6 V to about 1 mAh/cm$^2$ and discharged at about 10 mA/cm$^2$ to about 0.5 V. The inset digital photographs show the Swagelok cell setup.
Figure 6:
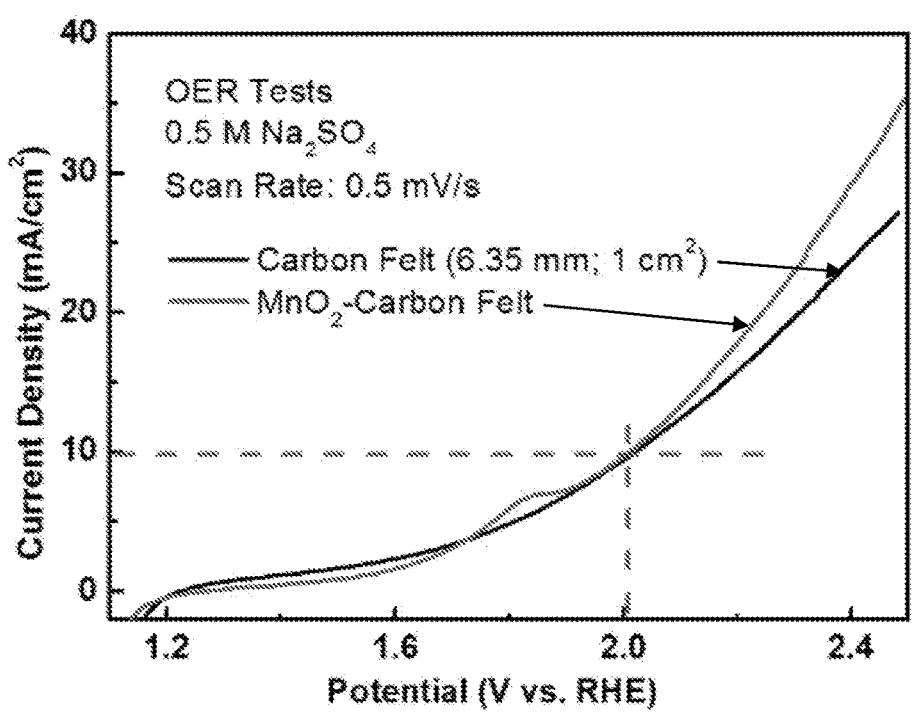
FIG. 6. Oxygen evolution reaction (OER) tests on carbon felt and MnO$_2$ coated carbon felt. The OER polarization curve at a scan rate of about 0.5 mV/s indicates that oxygen starts to generate at an onset potential of higher than about 2 V vs. reversible hydrogen electrode (RHE) at a current density of about 10 mA/cm$^2$. A low scan rate of about 0.5 mV/s was used for the OER test in order to suppress the double layer capacitance of the high surface area carbon felt. The anodic peak at a potential of about 1.83 V vs. RHE on MnO$_2$-carbon felt electrode is possibly ascribed to the deinsertion of Na$^+$ to MnO$_2$.
Figure 7:
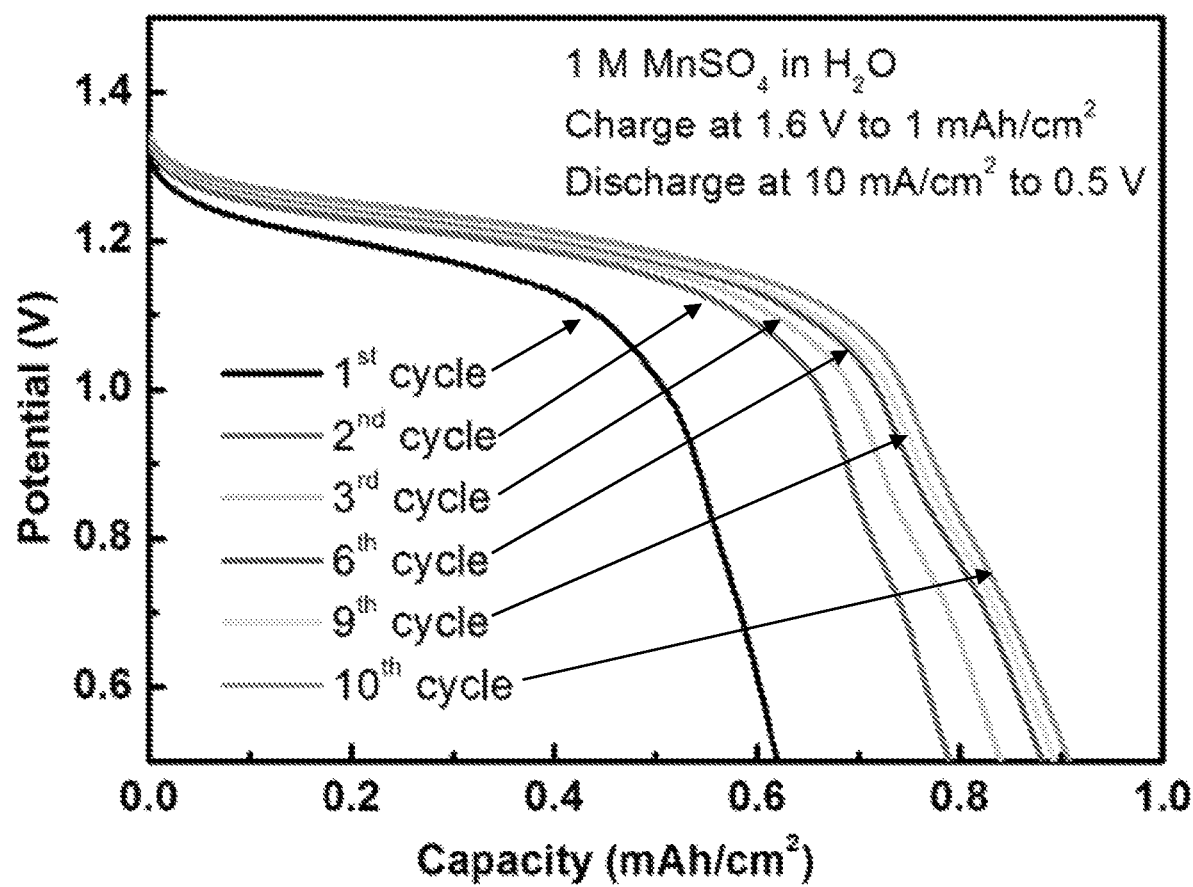
FIG. 7. The first ten cycles of discharge behavior of a Swagelok cell in an electrolyte of about 1 M MnSO$_4$.
Figure 8:
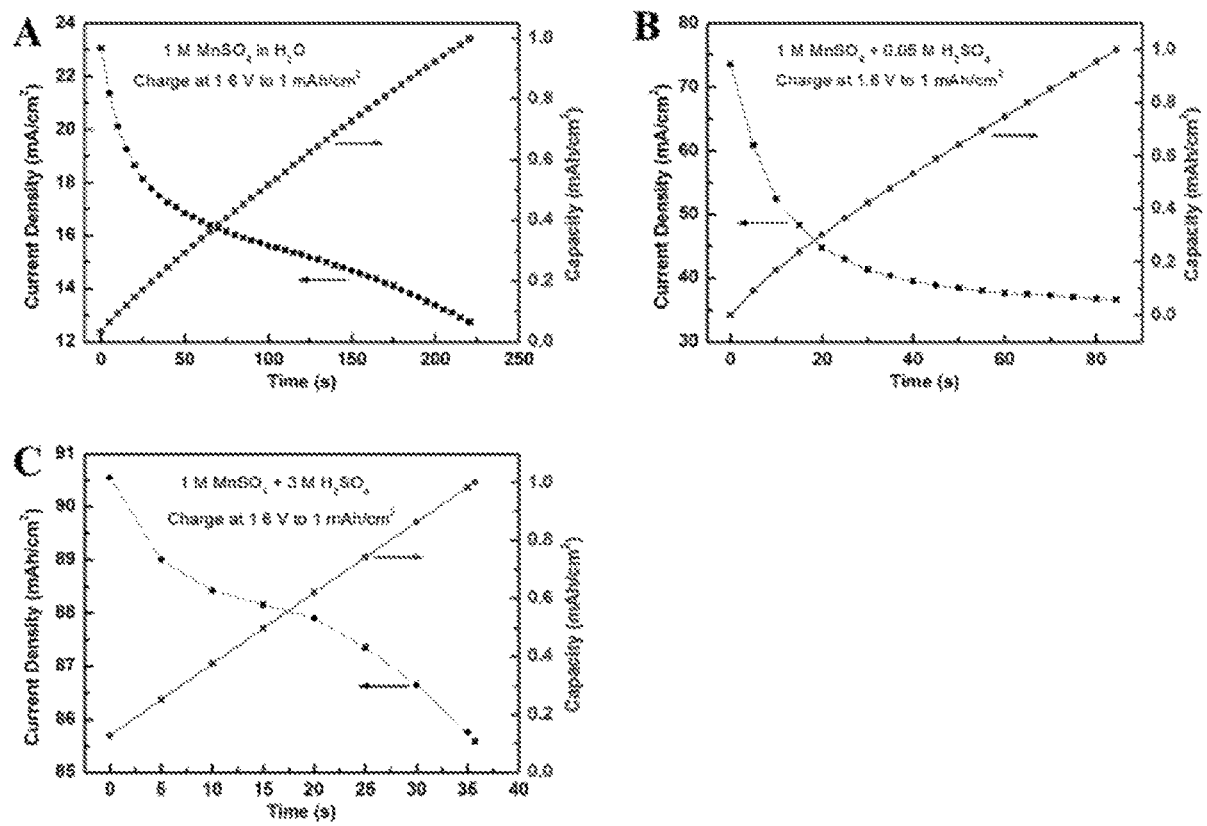
FIG. 8. Charge behaviors of Swagelok cells in electrolytes of (A) about 1 M MnSO$_4$, (B) about 1 M MnSO$_4$+about 0.05 M H$_2$SO$_4$ and (C) about 1 M MnSO4+about 3 M H$_2$SO$_4$. The cells were charged at about 1.6 V to a capacity of about 1 mAh/cm$^2$.
Figure 9:
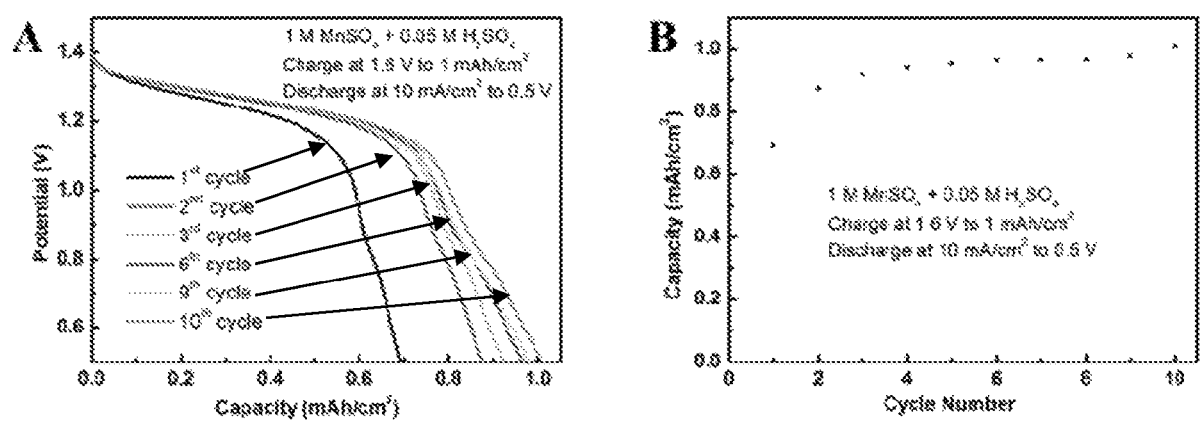
FIG. 9. (A) The first ten cycles of discharge behaviors of a Swagelok cell in an electrolyte of about 1 M MnS$_4$+about 0.05 M H$_2$SO$_4$. (B) Capacity retention of the cell.

In light of the proposed energy storage mechanism, construction of the SLGMB is performed in a custom-made Swagelok cell (FIG. 2 and FIG. 5) and electrochemical measurements are performed in an electrolyte of about 1 M $MnSO_4$ with various acidities at room temperature. In order to suppress oxygen evolution reaction at the cathode, chronoamperometry (e.g., substantial constant potential) technique is applied with optimal potential of about 1.6 V to charge the Swagelok cells. The $MnO_2$ coated carbon felt cathode shows an onset potential of higher than about 2 V towards oxygen evolution reaction (FIG. 6). It is noticed that the acidity of the electrolyte has an impact on the electrochemical performance of the SLGMB. The cell in the electrolyte of about 1 M $MnSO_4$ shows a typical battery discharge behavior with a clear discharge plateau at about 1.2 V. When charged to a capacity of about 1 $mAh/cm^2$, the first discharge efficiency of the cell is about 62%, which increases with the subsequent cycles, and reaching about 91% after ten cycles (FIG. 7). With the addition of a small amount of $H_2SO_4$ (about 0.05 M) into the about 1 M $MnSO_4$ electrolyte, the charge and discharge characteristics were improved drastically. Due to the higher ionic conductivity and proton concentration of the electrolyte, the charge current of the cell in about 1 M $MnSO_4$ with about 0.05 M $H_2SO_4$ is about three times higher than that in the about 1 M $MnSO_4$ electrolyte, leading to a much shorter charge time of about 85 s (FIG. 8). Additionally, the discharge plateau was increased by about 50 mV (FIG. 2A), demonstrating the improved kinetics of the cell in the electrolyte of about 1 M $MnSO_4$ with about 0.05 M $H_2SO_4$. Accordingly, the first discharge efficiency of the cell improved to about 70%, and its discharge capacity can reach about 1 $mAh/cm^2$ with efficiency of about 100% after the initial activation cycles (FIG. 9). The areal capacity of about 1 $mAh/cm^2$ corresponds to a specific capacity of about 616 mAh/g on the basis of two-electron-transfer charge storage mechanism, revealing the achievement of theoretical capacity in the SLGMB. Further increasing the acidity of the electrolyte results in improved electrochemical properties of the cells in terms of shorter charge time and higher discharge potential.

For example, the cell in the electrolyte of about 1 M $MnSO_4$ with about 3 M $H_2SO_4$ shows a very fast charge rate of about 36 s (about 100 C rate) to reach a corresponding capacity of about 1 $mAh/cm^2$ (FIG. 8C). Its discharge plateau is located above about 1.4 V, which is increased by at least 200 mV as compared to the cell in the acid-free electrolyte (FIG. 2A). However, due to the harsh condition of the highly acidic electrolytes and resulting corrosive issues, further attention was devoted to the cells operating in mildly acidic or nearly neutral electrolytes. Thereafter, further attention was devoted to manganese batteries in the electrolyte of about 1 M $MnSO_4$ with about 0.05 M $H_2SO_4$ unless otherwise specified.

Figure 10:
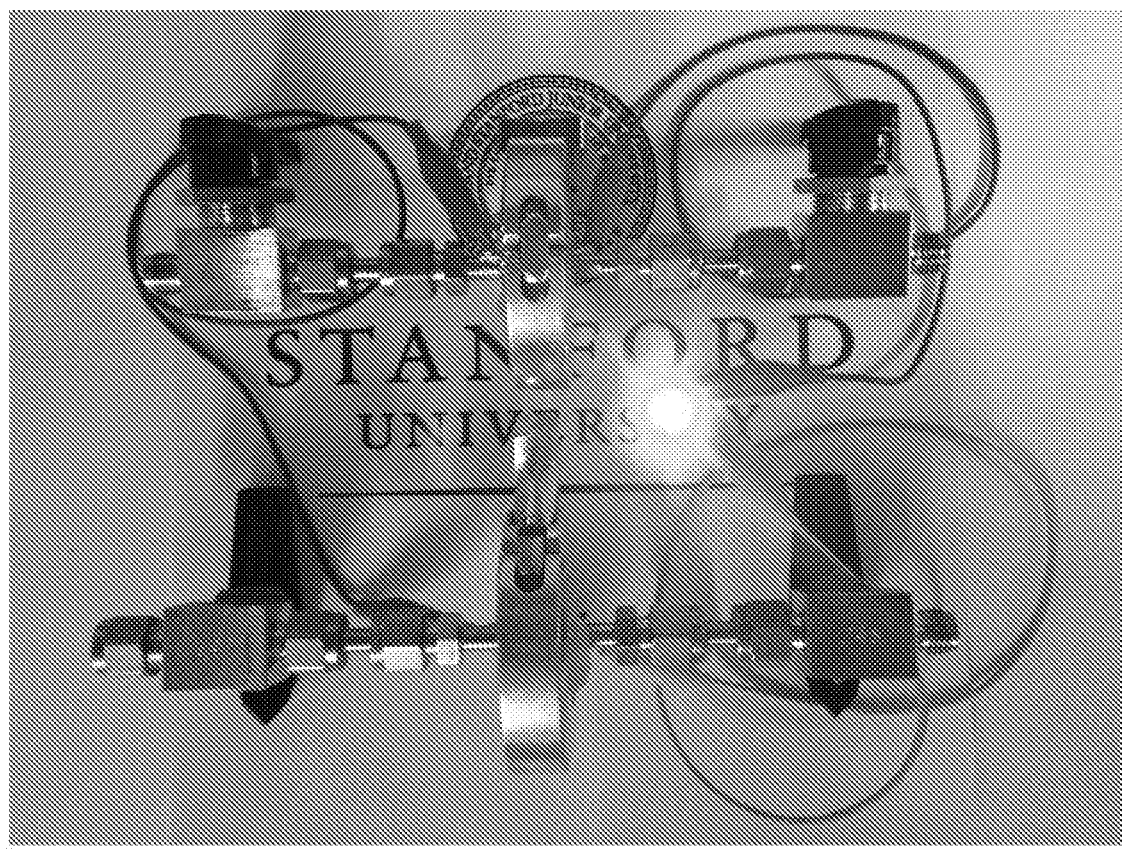
FIG. 10. Light-emitting diode (LED) lighting by Swagelok cells. A blue LED was powered by two Swagelok cells that connect in series when charged at about 1.6 V for about 3 minutes.
Figure 11:
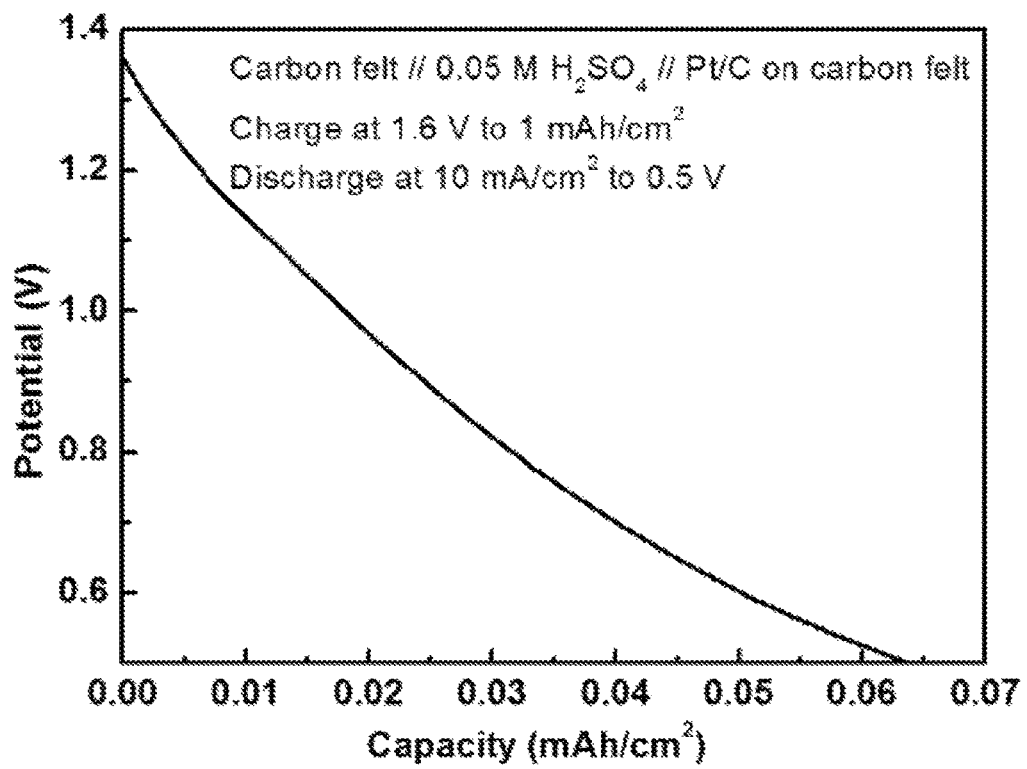
FIG. 11. Electrochemical double layer capacitive (EDLC) contribution ascribed to high surface area carbon felt current collectors. The measurement setup is the same as that of a Swagelok cell except that MnSO$_4$ was excluded in an electrolyte. The capacity of the EDLC in the Swagelok cell is about 0.064 mAh/cm$^2$. This value corresponds to an extra capacity observed in the long-term cycling test of the Swagelok cell as shown in FIG. 2C.
Figure 12:
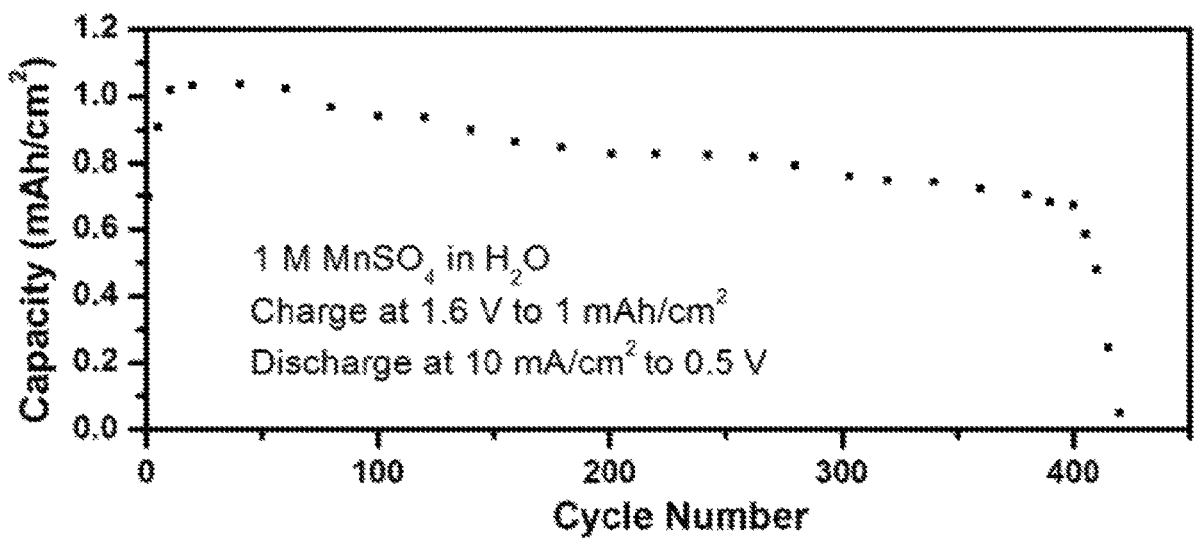
FIG. 12. Cycle performance of a Swagelok cell in about 1 M MnSO$_4$ electrolyte.

Rate capability and long term cycle stability of batteries are of importance to practical energy storage applications. As shown in FIG. 2B, when the discharge current increased from about 10 $mA/cm^2$ (about 10 C rate) to about 50 C and even about 100 C, the discharge capacity of the cell can still maintain nearly about 1 $mAh/cm^2$, exhibiting its excellent rate capability and high power density. Practically, it is demonstrated that the cells are capable of lighting a blue light-emitting diode (LED) for a few hours when they were quickly charged at about 1.6 V for about 3 minutes (FIG. 10). Impressively, the SLGMB presents a very stable rechargeability, showing no noticeable capacity decay over 10,000 cycles at a charge capacity of about 1 $mAh/cm^2$ after the initial activation cycles (FIG. 2C and FIG. 9B). It is worth noting that the actual discharge capacity of the cell is slightly higher than about 1 $mAh/cm^2$. This is due to the extra capacity contribution from the electrochemical double layer capacitance of the high surface area carbon felt current collectors (FIG. 11). In contrast, the cell in pure $MnSO_4$ electrolyte shows gradual capacity decay after 400 cycles and then severe degradation (FIG. 12). The correlation of the electrochemical behavior with the acidity of the electrolyte indicates the importance of the electrolyte optimization for outstanding electrochemical performance of the manganese batteries.

Figure 3:
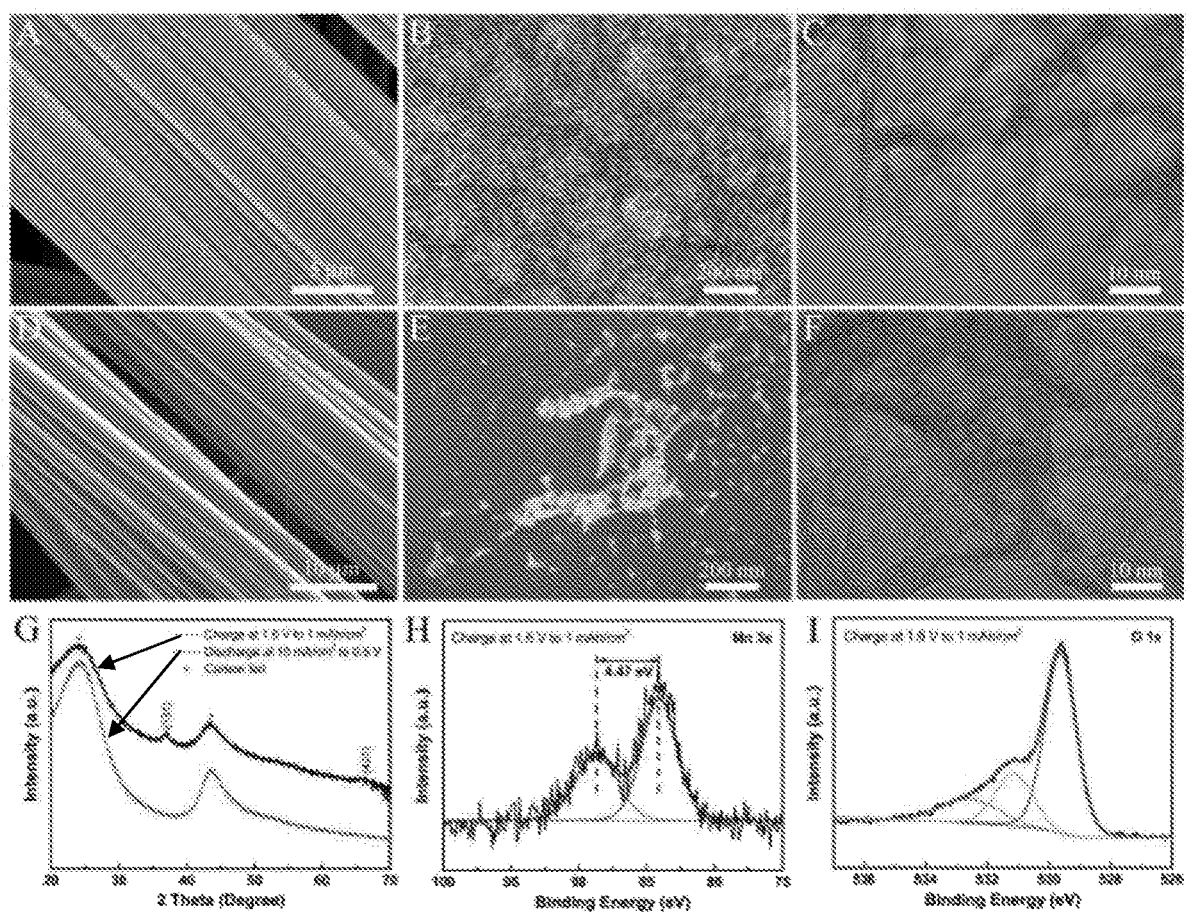
FIG. 3. Characterization of a cell cathode. (A, B) Scanning electron microscopy (SEM) and (C) transmission electron microscopy (TEM) images of the cathode after first charging at about 1.6 V to about 1 mAh/cm$^2$. (D, E) SEM and (F) TEM images of the cathode after first discharging at about 10 mA/cm$^2$ to about 0.5 V. The circled areas indicate generated nanopores by $MnO_2$ dissolution in FIG. 3F. (G) X-ray diffraction (XRD) spectra of the cathode after the first charge and discharge. (H) X-ray photoelectron spectroscopy (XPS) Mn 3 s and (I) O 1 s of the cathode after first charging at about 1.6 V to about 1 mAh/cm$^2$.
Figure 13:
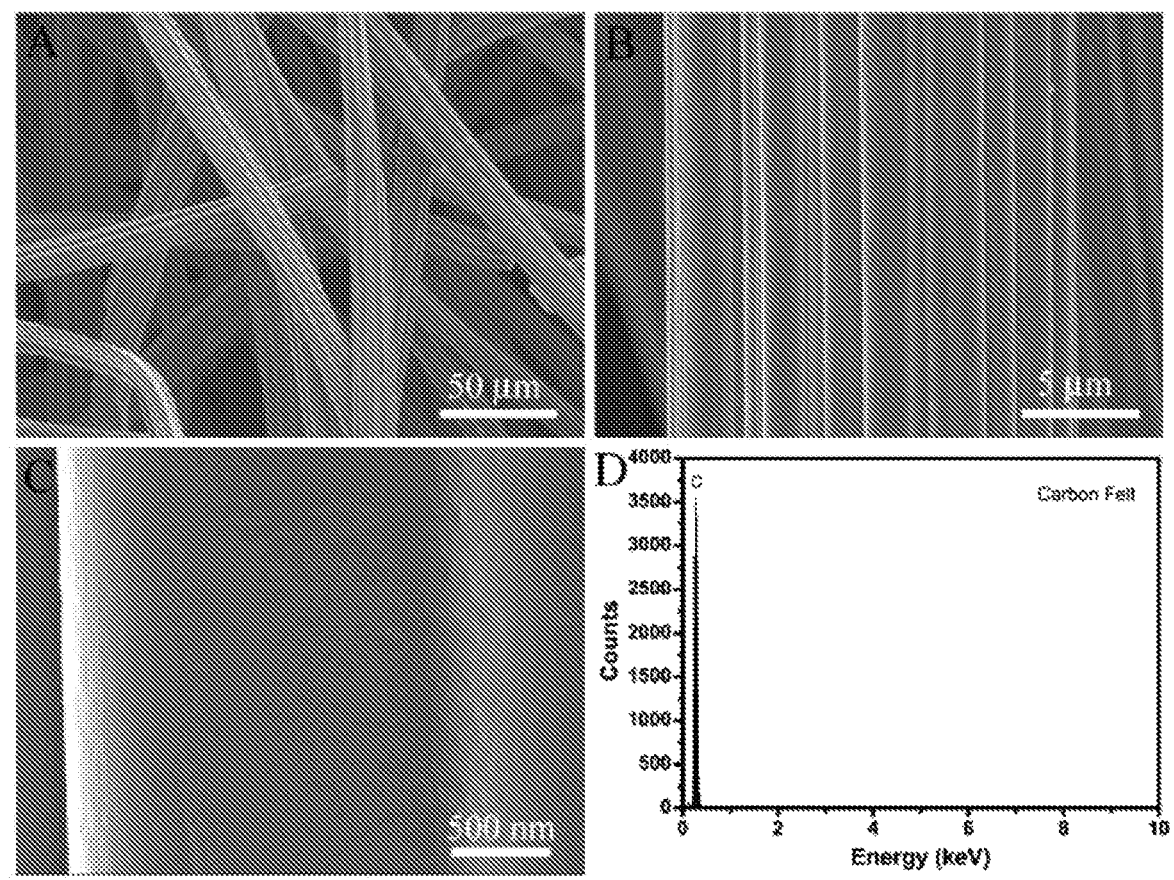
FIGS. 13. (A), (B), and (C) SEM images of varying magnifications and (D) energy dispersive X-ray spectroscopy (EDX) spectrum of a carbon felt.
Figure 14:
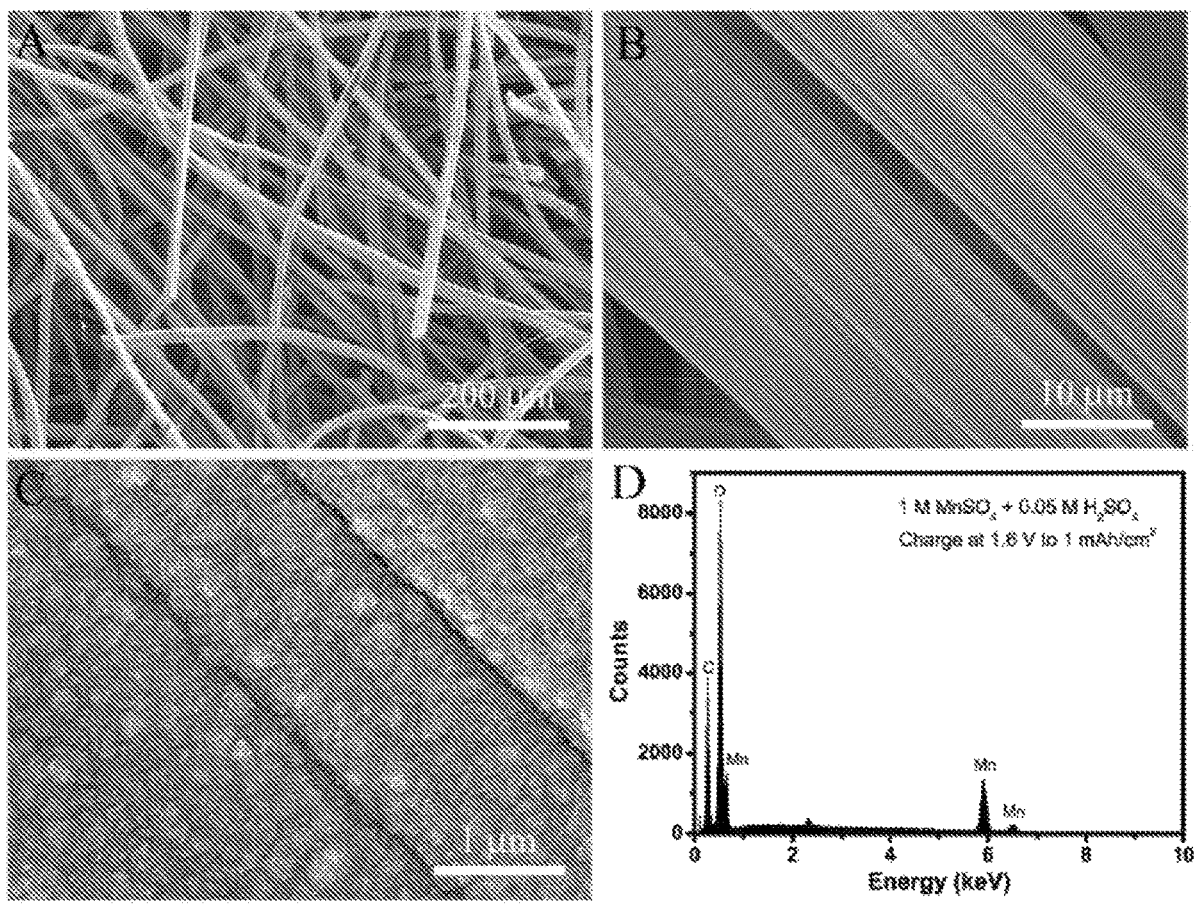
FIGS. 14. (A), (B), and (C) SEM images of varying magnifications and (D) EDX spectrum of a cell cathode when charged at about 1.6 V to about 1 mAh/cm$^2$ in an electrolyte of about 1 M MnSO$_4$+ about 0.05 M H$_2$SO$_4$. It is noted that despite a thorough wash of the cathode in de-ionized (DI) water after cell assembly, some glass microfibers from a separator were still observed in FIG. 14A.
Figure 15:
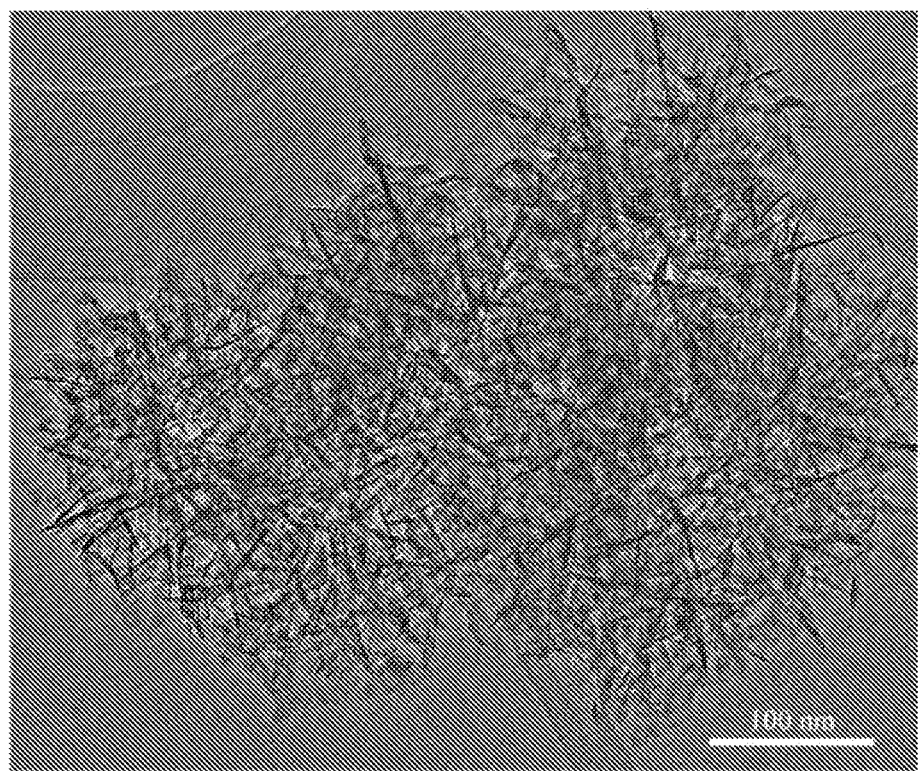
FIG. 15. TEM image of deposited MnO$_2$.
Figure 16:
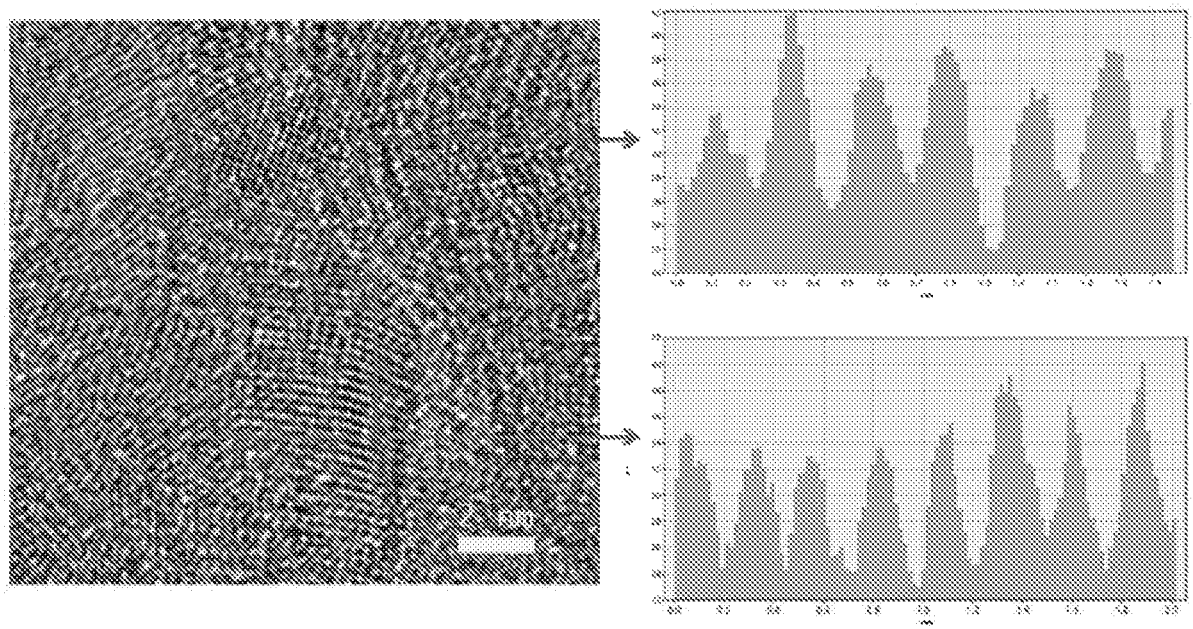
FIG. 16. High resolution TEM (HRTEM) image of deposited MnO$_2$ showing lattice fringes of (131) and (031) planes.
Figure 17:
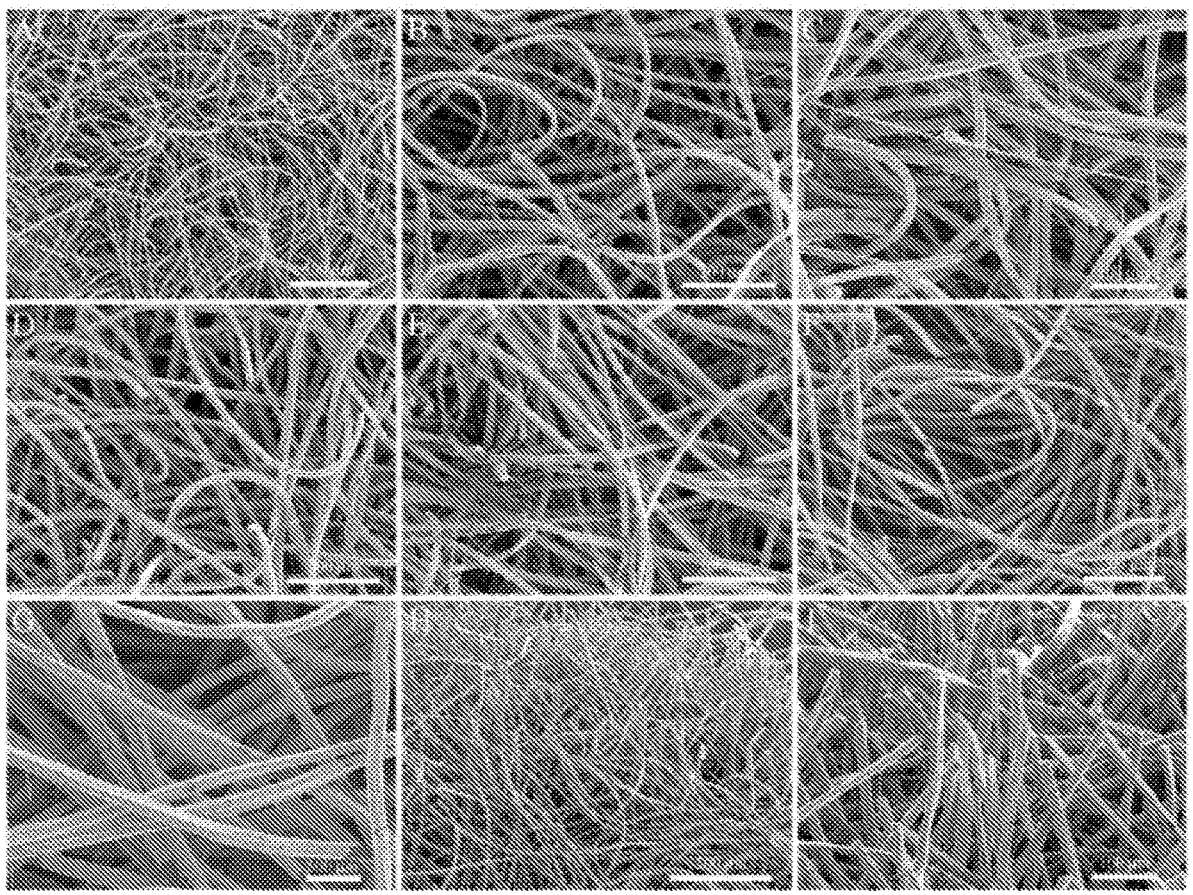
FIG. 17. (A), (B), (C), (D), (E), (F), (G), (H), and (I) SEM images of different areas of a MnO$_2$ coated carbon felt cathode. A cell was charged at about 1.6 V to about 1 mAh/cm$^2$ in an electrolyte of about 1 M MnSO$_4$+about 0.05 M H$_2$SO$_4$.
Figure 18:
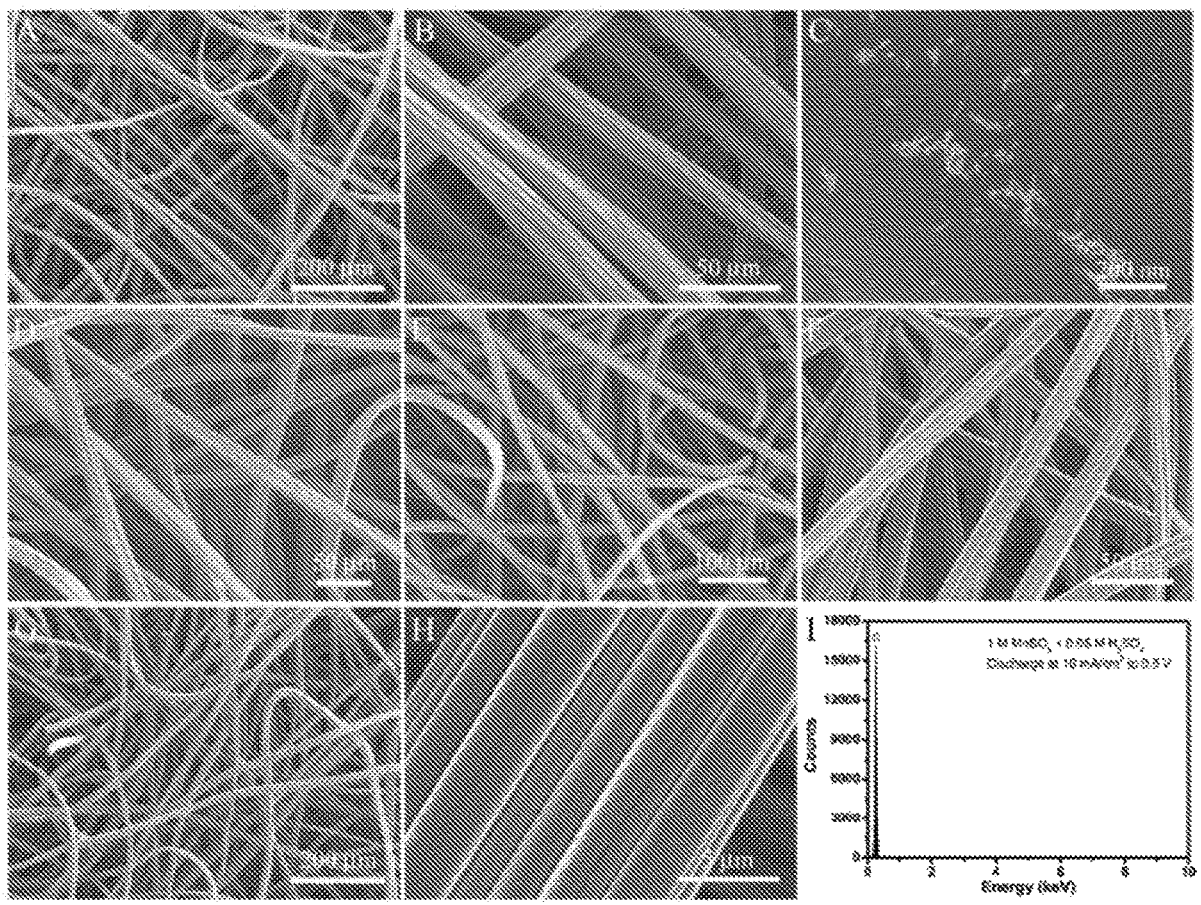
FIG. 18. (A), (B), (C), (D), (E), (F), (G), and (H) SEM images of different portions and (I) EDX spectrum of a substantially fully discharged carbon felt cathode. A cell was charged at about 1.6 V to about 1 mAh/cm$^2$ in an electrolyte of about 1 M MnS$_4$+about 0.05 M H$_2$SO$_4$ and then discharged at about 10 mA/cm$^2$ to about 0.5 V.
Figure 19:
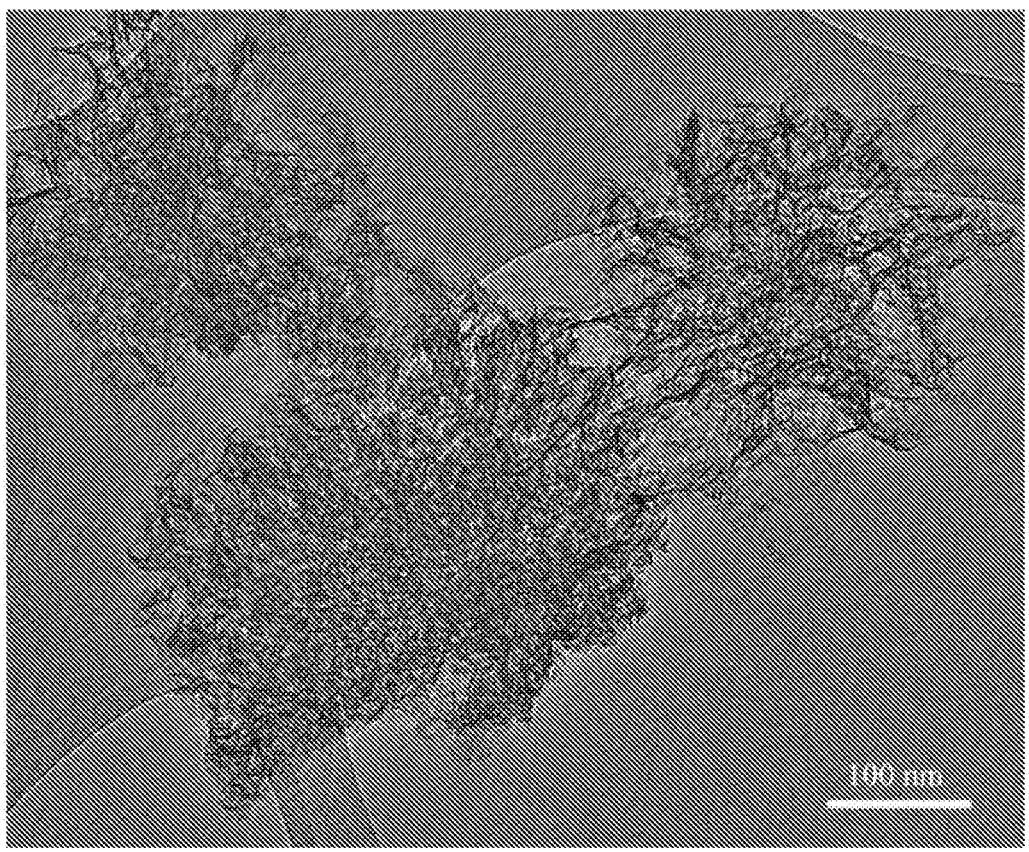
FIG. 19. TEM image of MnO$_2$ residues on a substantially fully discharged carbon felt cathode. A cell was charged at about 1.6 V to about 1 mAh/cm$^2$ in an electrolyte of about 1 M MnS$_4$+about 0.05 M H$_2$SO$_4$ and then discharged at about 10 mA/cm$^2$ to about 0.5 V.
Figure 20:
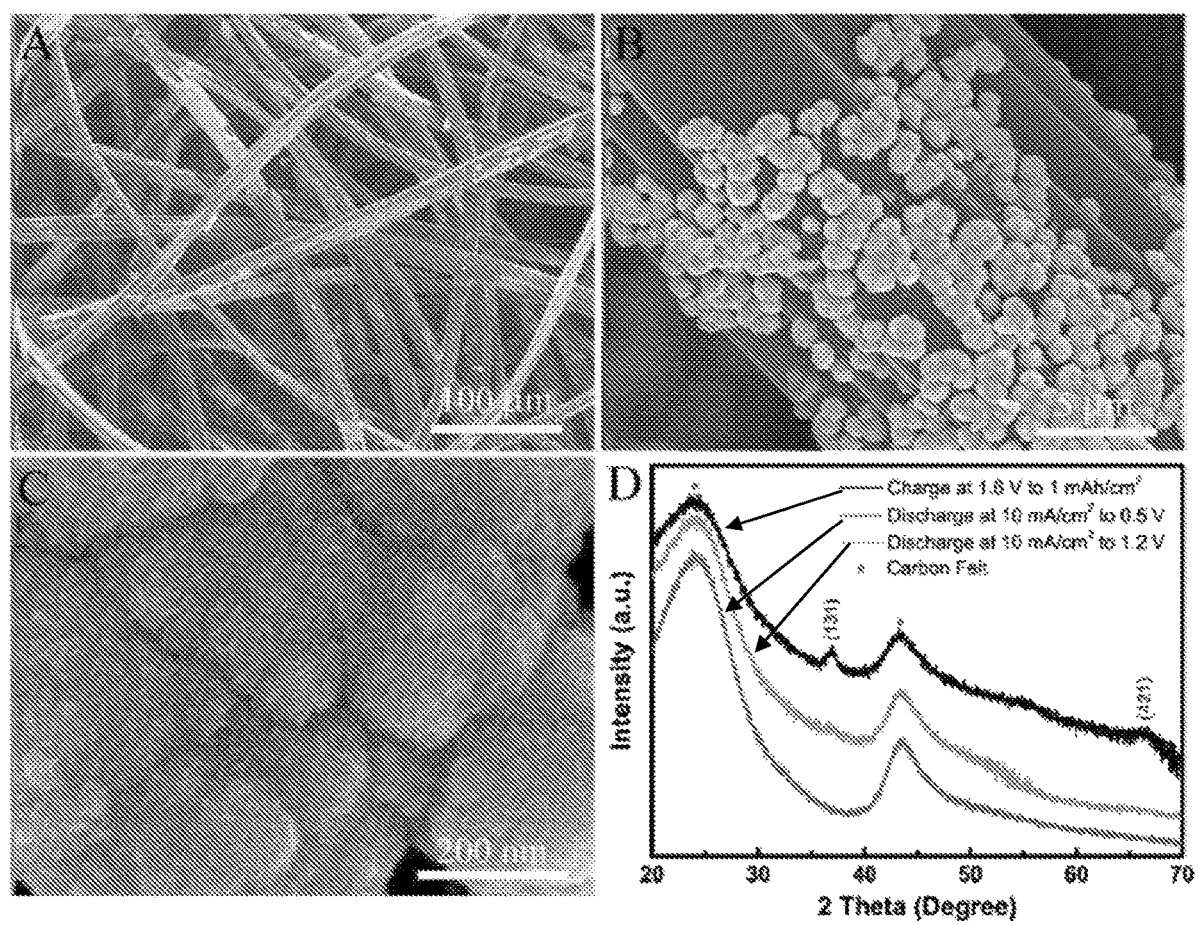
FIGS. 20. (A), (B), and (C) SEM images and (D) XRD spectrum of a partially discharged carbon felt cathode. A cell was charged at about 1.6 V to about 1 mAh/cm$^2$ in an electrolyte of about 1 M MnS$_4$+about 0.05 M H$_2$SO$_4$ and then discharged at about 10 mA/cm$^2$ to about 1.2 V.

To investigate the change of the electrodes and to confirm the energy storage mechanism of the SLGMB, examination is performed of the reversible manganese precipitation-dissolution reactions at the cathode by different characterizations. Ex-situ scanning electron microscopy (SEM) images show that, compared to the clean surface of pristine carbon felt (FIG. 13), the carbon felt cathode after the first charge to about 1 $mAh/cm^2$ was substantially covered with a uniform layer of $MnO_2$ (FIG. 3A and FIG. 14). The $MnO_2$ was confirmed by X-ray diffraction (XRD) to be of gamma phase (FIG. 3G), which is consistent with the characteristic of electrolytic manganese dioxide. The energy dispersive X-ray spectroscopy (EDX) of the $MnO_2$ shows pronounced peaks of Mn and O, further confirming the composition of $MnO_2$ (FIG. 14D). High resolution SEM image demonstrates a nanoporous layer of $MnO_2$ with nearly vertically aligned nanosheets (FIG. 3B), which were further characterized by transmission electron microscopy (TEM) to be of a crumpled and entangled nanostructure (FIG. 3C and FIG. 15). High resolution TEM (HRTEM) shows the lattice fringes of about 0.24 nm and about 0.26 nm, corresponding to the (131) and (031) planes of gamma $MnO_2$, respectively (FIG. 16). Examination of various different areas of the cathode after the first charge indicates the uniform deposition of $MnO_2$ over the whole carbon felt cathode (FIG. 17). In contrast, the $MnO_2$ on the cathode disappeared remarkably after the first full discharge to about 0.5 V, turning the carbon felt back to its pristine morphology (FIG. 3D and FIG. 18). This is in a good agreement with the result of XRD, depicting the disappearance of the characteristic peaks of $MnO_2$ (FIG. 3G). Observation of different areas over the whole cathode confirms the thorough dissolution of the $MnO_2$ upon full discharge, where EDX shows just carbon peaks on the cathode (FIG. 18). However, it was found that a small portion of the $MnO_2$ residue remained on the carbon fiber, probably due to the incomplete dissolution of $MnO_2$ in the first discharge process (FIG. 3E). The $MnO_2$ residues were characterized by TEM to be of similar morphology as the deposited $MnO_2$ (FIG. 3F and FIG. 19). In addition, numerous nanopores are clearly visible on the discharged $MnO_2$ residues (FIG. 3F), which were formed by the gradual dissolution of the $MnO_2$ during discharge and left as traces of the incomplete dissolution. To better understand the charge storage mechanism of the SLGMB system, investigation of the cathode under different discharge cut-off voltages is performed. For example, when the cell was not fully discharged (cut-off voltage of about 1.2 V), the cathode shows morphology of partially coated carbon fiber with $MnO_2$, demonstrating that the discharge process is indeed a gradual dissolution process (FIG. 20). The XRD spectrum of the cathode discharged to about 1.2 V shows much weaker crystalline peaks of $MnO_2$ as compared to its charged state (FIG. 20D).

Figure 21:
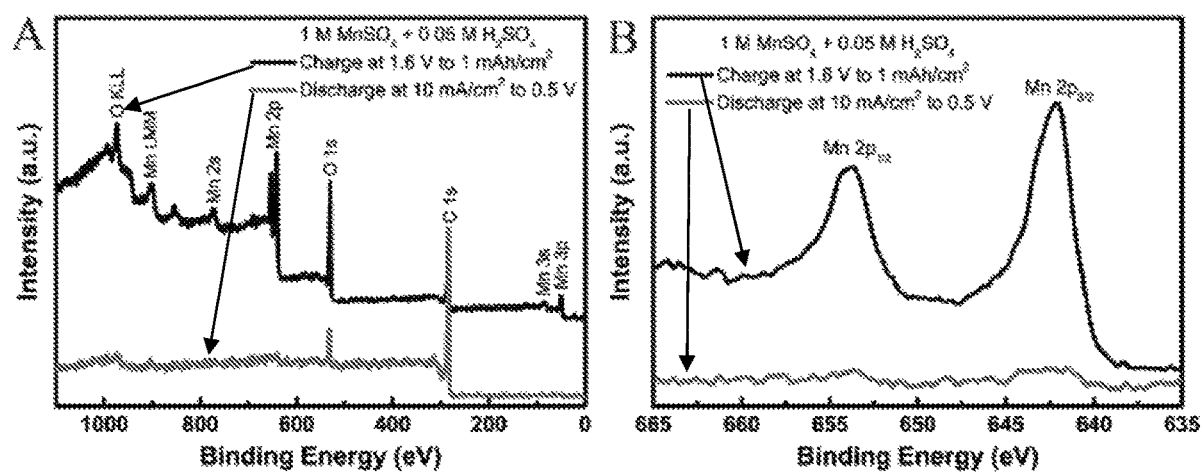
FIGS. 21. (A) XPS survey and (B) Mn 2p spectra of a cathode at charged and discharged stages.

To evaluate the oxidation state of the deposited $MnO_2$, X-ray photoelectron spectroscopy (XPS) measurements are performed on the cathode under the charged and discharged stages. The cathode after charging to about 1 $mAh/cm^2$ shows pronounced spectra of Mn, which substantially disappeared when fully discharged (FIG. 21). The core-level spectra of Mn 2 s and O is were utilized to determine the manganese oxidation states. In the case of the cathode at its charged stage, the average oxidation state of $MnO_2$ was calculated to be about 3.9 on the basis of the Mn 2 s peak splitting energy of about 4.47 eV (FIG. 3H). Therefore, the actual electron charge transfer number in the manganese battery is about 1.9, corresponding to a specific capacity of about 585 mAh/g. In addition, the deconvoluted O 1 s spectrum can be fitted with three components which are associated to the Mn—O—Mn bond for tetravalent $MnO_2$, the Mn—OH bond for trivalent MnOOH, and H—O—H bond for residue water in the materials, respectively (FIG. 3I).

Figure 22:
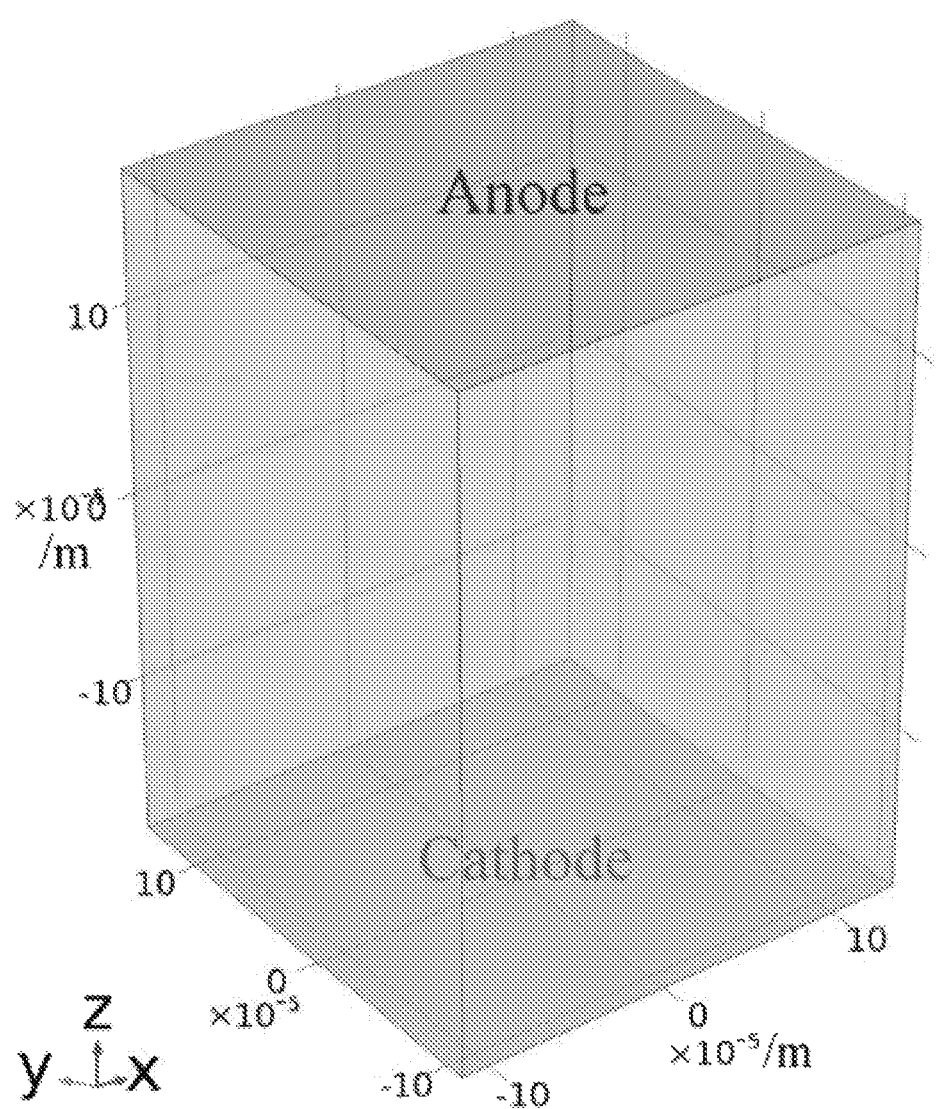
FIG. 22. Simulation cell geometry.
Figure 23:
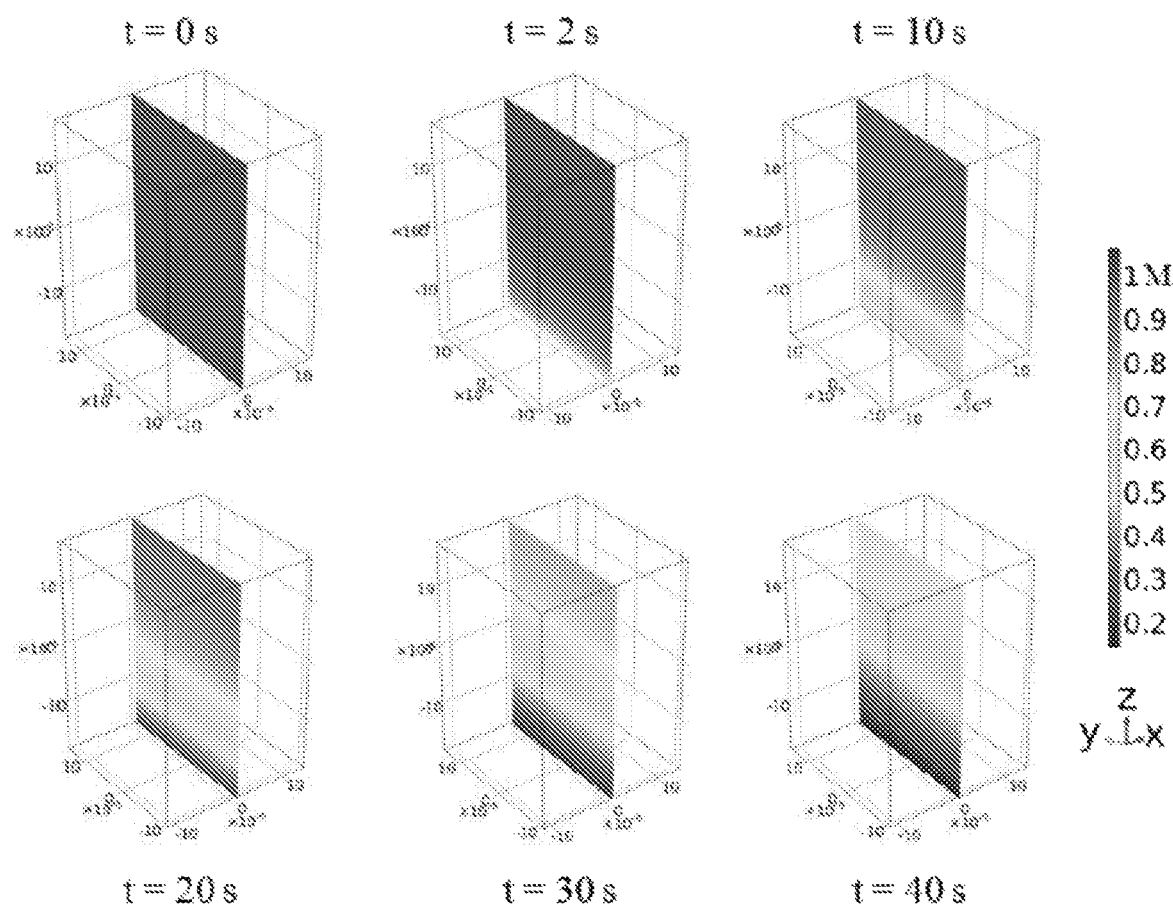
FIG. 23. Simulation results of cell electrolyte concentration variation when charging at 1.6 V to 1 mAh/cm$^2$.
Figure 24:
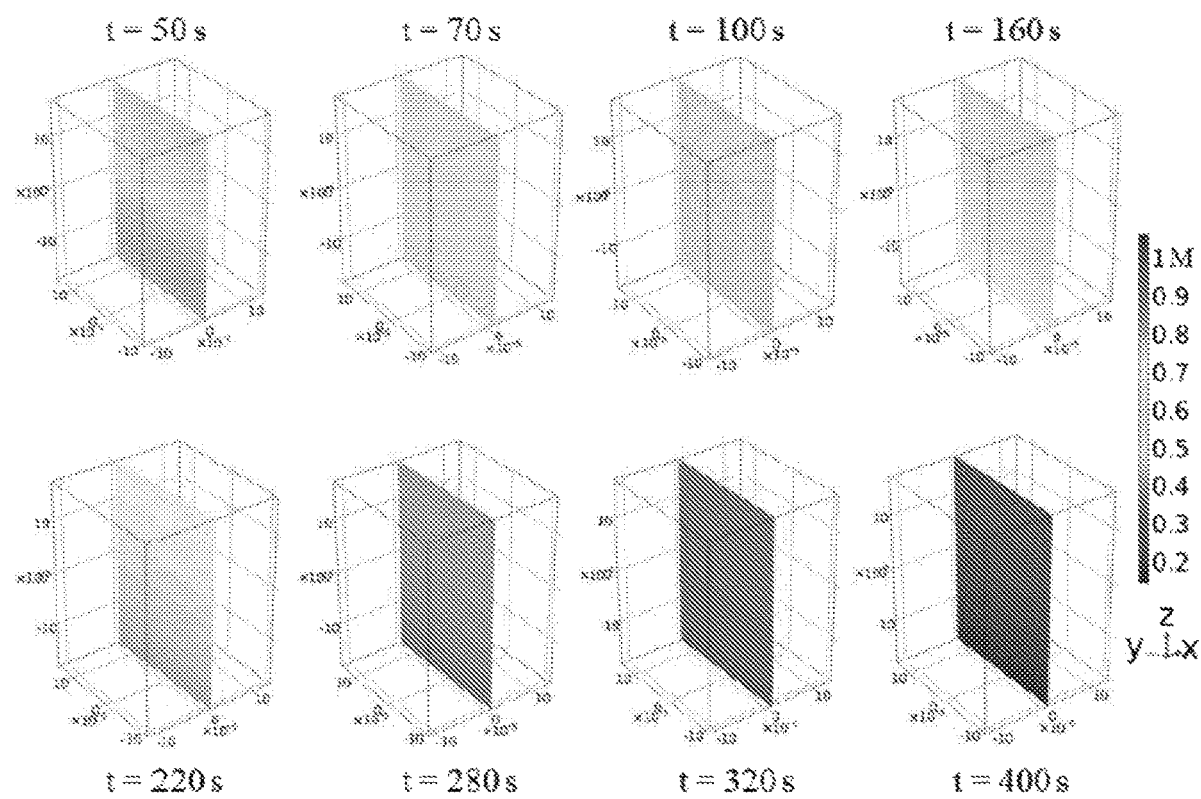
FIG. 24. Simulation results of cell electrolyte concentration variation when discharging at 10 mA/cm$^2$.
Figure 26:
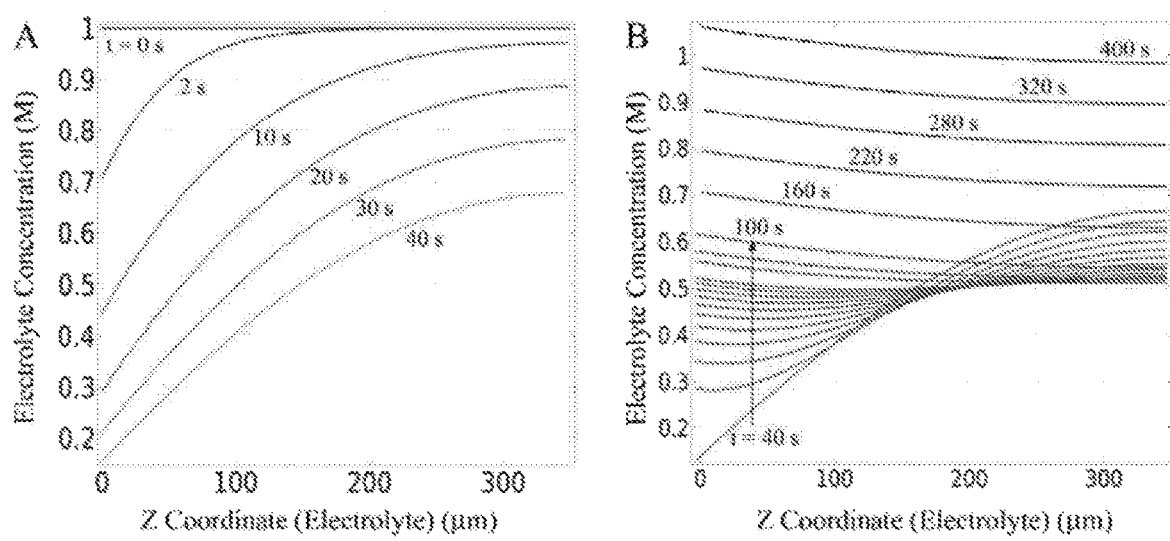
FIG. 26. (A) Electrolyte concentration variations with positions along a direction of Mn$^{2+}$ ion flux during charging times of 0, 2, 20, and 40 s. (B) Electrolyte concentration variations with positions along the direction of Mn$^{2+}$ ion flux during discharging times of 40-60 (with even times, namely 40, 42, 44, and so forth), 70, 80, 100, 160, 220, 280, 320, and 400 s.
Figure 27:
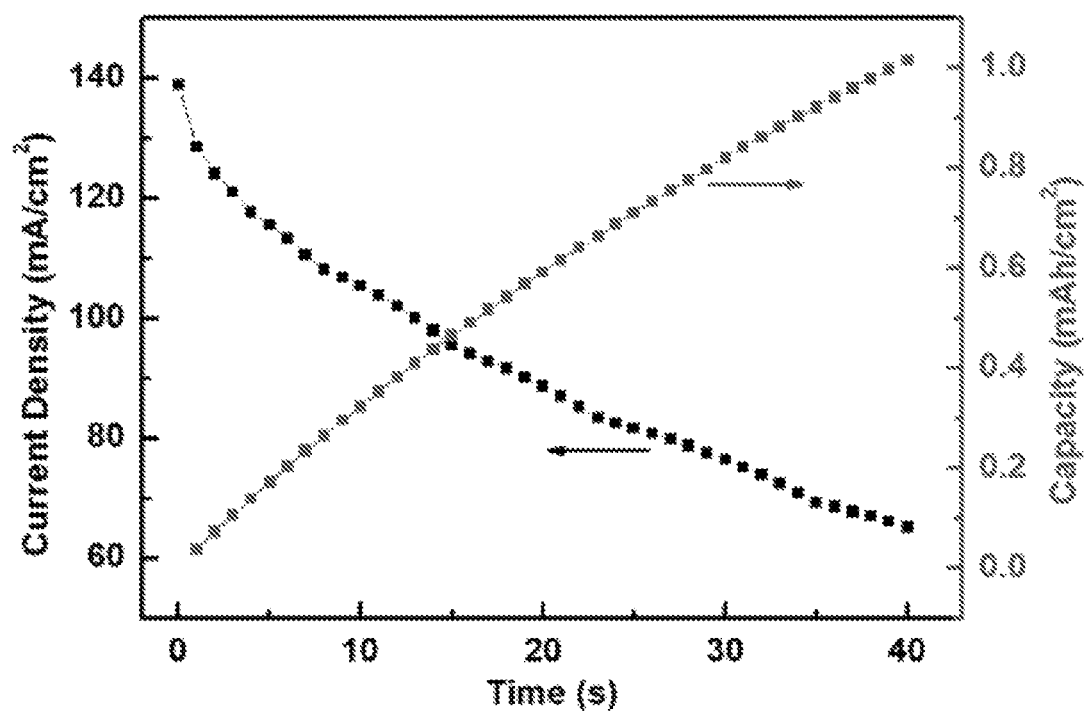
FIG. 27. Current density and capacity vs. charge time in a simulated charge process.

To understand the nature of the charge storage mechanism, a finite element oriented model in COMSOL is applied to mimic the $MnO_2$ deposition-dissolution process at the cell cathode by simulating the dynamic variations of the electrode reactions and the electrolyte concentrations over a complete charge and discharge process (FIG. 22). The simulated color spectra (FIGS. 23, 24 and 25) and their corresponding electrolyte concentration distribution curves (FIG. 26) represent the completely reversible process of the $MnO_2$ deposition-dissolution reactions and their fast charge rates (FIG. 27).

Figure 28:
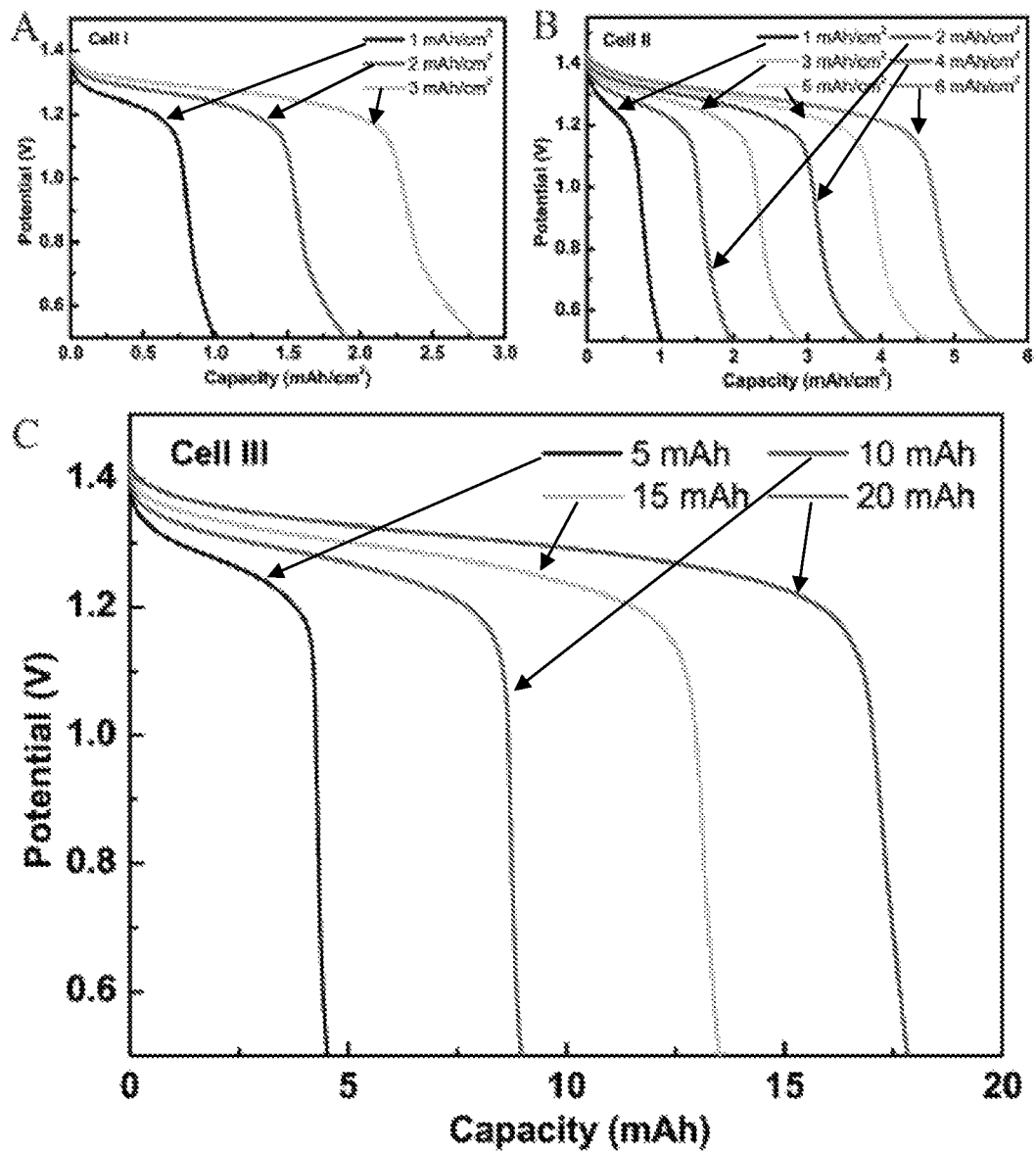
FIG. 28. Discharge behaviors of (A) cell I, (B) cell II and (C) cell III under different charge capacities. These Swagelok cells were charged at about 1.6 V in an electrolyte of about 1 M MnS$_4$+ about 0.05 M H$_2$SO$_4$ and then discharged at about 10 mA/cm$^2$ to about 0.5 V.
Figure 29:
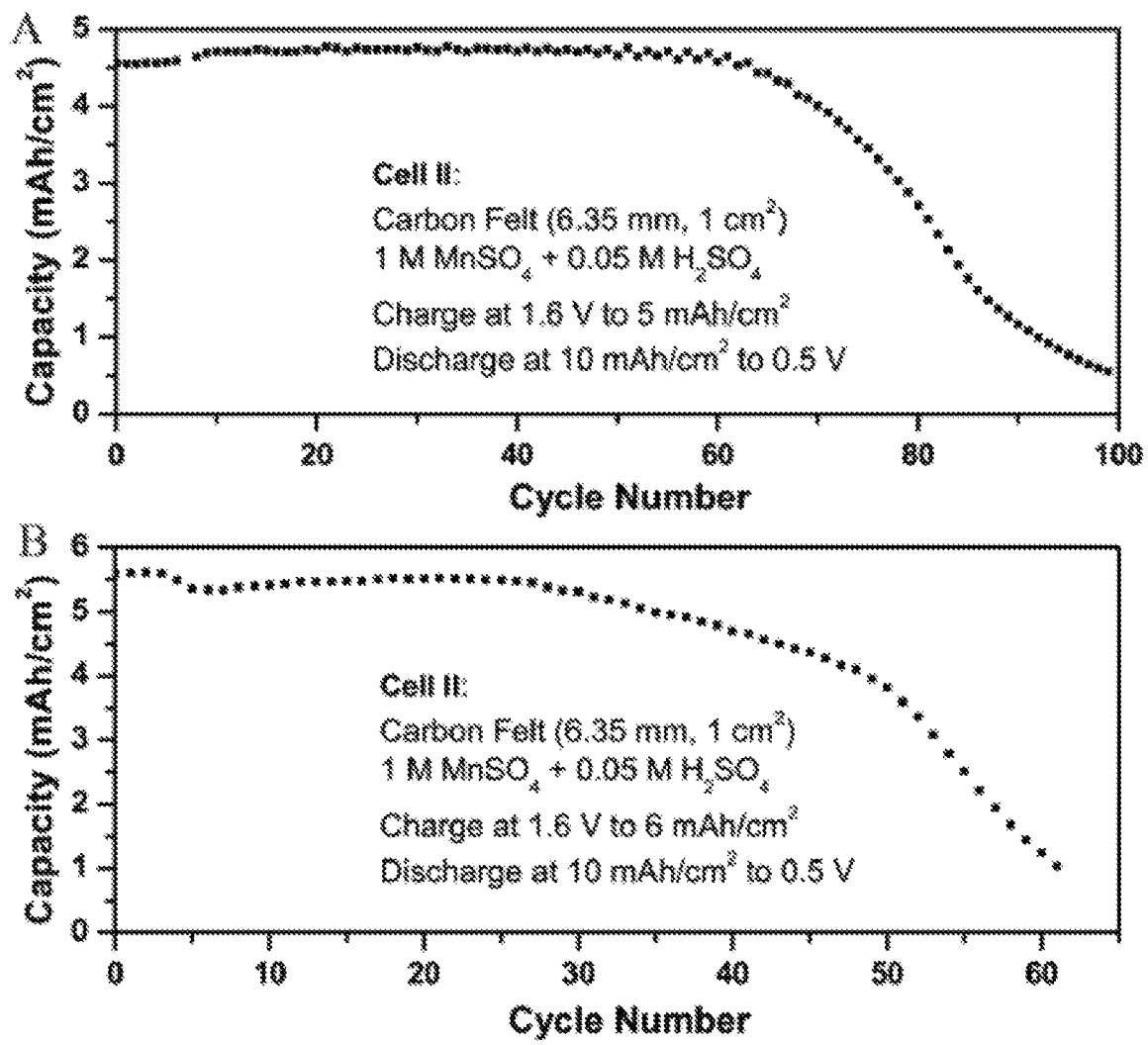
FIG. 29. Cycle stability tests of Swagelok cell II under charge capacity of (A) about 5 mAh/cm$^2$ and (B) about 6 mAh/cm$^2$, respectively.
Figure 30:
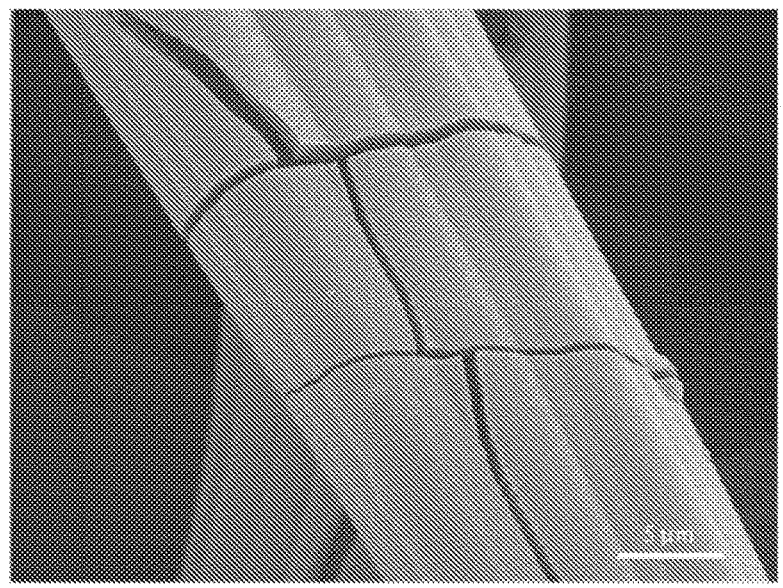
FIG. 30. SEM image of a cathode of cell II when charged at about 1.6 V to about 6 mAh/cm$^2$.
Figure 31:
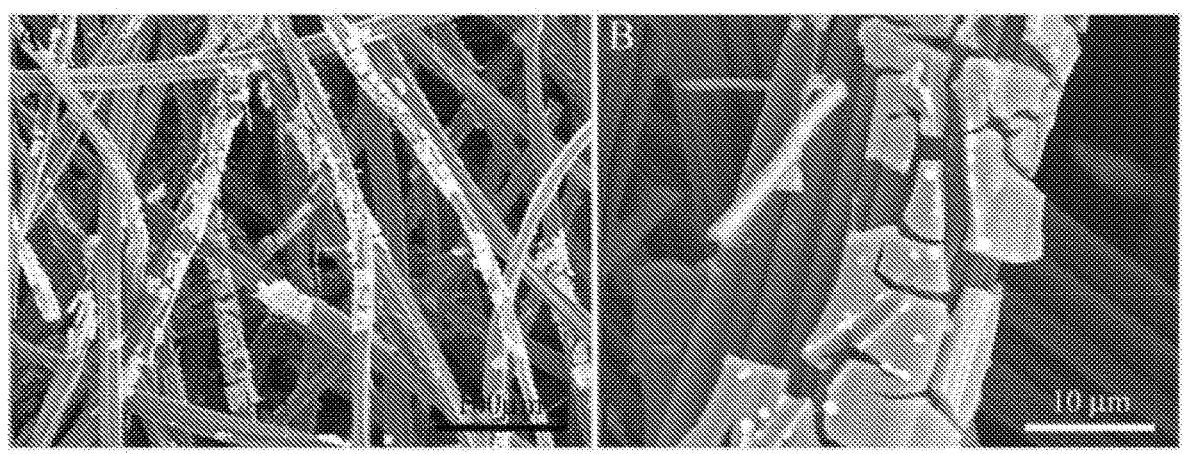
FIG. 31. SEM images of a cathode of cell II after discharged at about 10 mA/cm$^2$ to about 0.5 V, when it was first charged at about 1.6 V to about 6 mAh/cm$^2$.

In an attempt to increase the battery capacity for large-scale energy storage application, two different approaches are developed to scale up the energy storage capacity of the SLGMB. In the first approach, the cell capacity is increased by using thicker cathode carbon felts with a larger surface area. The corresponding cells with different carbon felt cathodes are denoted as cell I (thickness: about 3.18 mm; area: about 1 $cm^2$), cell II (thickness: about 6.35 mm; area: about 1 $cm^2$) and cell III (thickness: about 6.35 mm; area: about 2.5 $cm^2$), respectively. As shown in FIG. 28 and summarized in FIG. 4A, the capacity of the cell II (about 3.78 mAh) is nearly double that of the cell I (about 1.9 mAh) by replacing the cathode with a double thickness. Similarly, the capacity of the cell III can be further increased to about 8.97 mAh by increasing the cathode area by about 2.5 times. The rechargeability test of cell II under high charge capacity of about 4 mAh/cm$^2$ shows excellent durability with a discharge capacity of about 3.86 mAh/cm$^2$ after 600 cycles (FIG. 4B), which corresponds to a capacity retention of as high as about 96.5%. However, due to the relatively poor electrical conductivity of MnO$_2$ ($10^{-5}$-$10^{-6}$ S/cm), it was found that the reversibility of the cell decreases beyond a charge capacity of about 4 mAh/cm$^2$. Consequently, when cycling cell II at charge capacities of about 5 and about 6 mAh/cm$^2$, its discharge capacities decayed gradually in the initial cycles and dropped afterwards (FIG. 29). Looking for the performance degradation mechanism of the cell under high charge capacity, it is observed from SEM images that the cathode at charge capacity of about 6 mAh/cm$^2$ was heavily coated with a thick layer of MnO$_2$, some of which tend to be exfoliated from the carbon fibers due to the large thickness induced mechanical cracking (FIG. 30). Such exfoliation results in the loss of active materials and the decrease of electrolyte species, which in turn slows down the deposition process and aggravates the efficiency of the discharge process. Indeed, the cell cathode after discharge exhibited incomplete dissolution and partial exfoliation of MnO$_2$ from the carbon felt (FIG. 31). The cycle stability tests under different charge capacities indicate desirability of control of the charge capacity for stable electrochemical performance. Overall, the Swagelok cells designed in this example showed capability of battery scale-up for large-scale energy storage applications.

Figure 4:
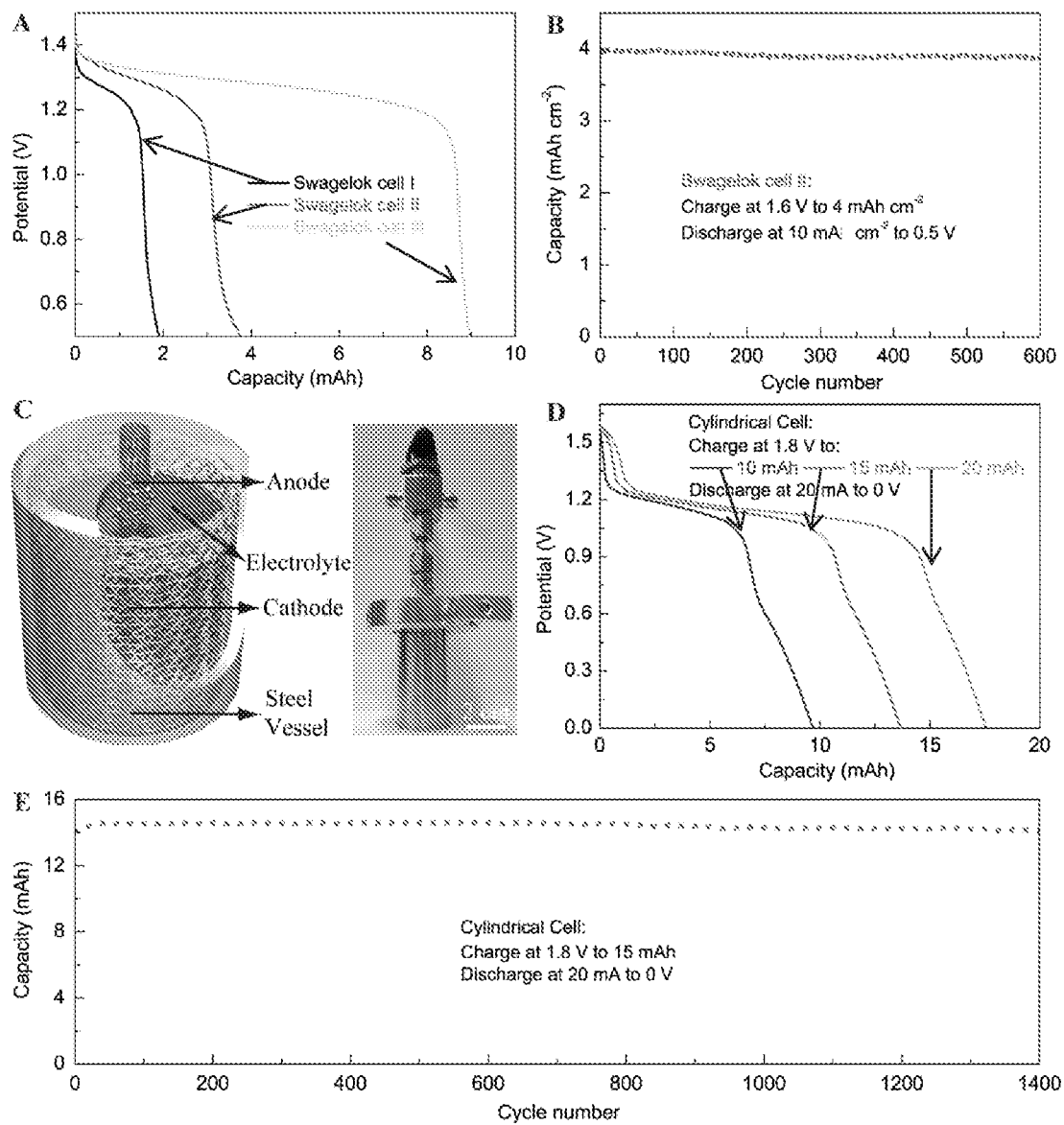
FIG. 4. Scale-up of SLGMB. (A) Discharge behaviors of Swagelok cells with three different electrode sizes. Swagelok cell I (cathode thickness of about 3.18 mm and area of about 1 cm$^2$) was charged at about 1.6 V to about 2 mAh (about 2 mAh/cm$^2$) and discharged at about 10 mA/cm$^2$ to about 0.5 V. Swagelok cell II (cathode thickness of about 6.35 mm and area of about 1 cm$^2$) was charged at about 1.6 V to about 4 mAh (about 4 mAh/cm$^2$) and discharged at about 10 mA/cm$^2$ to about 0.5 V. Swagelok cell III (cathode thickness of about 6.35 mm and area of about 2.5 cm$^2$) was charged at about 1.6 V to about 10 mAh (about 4 mAh/cm$^2$) and discharged at about 10 mA/cm$^2$ to about 0.5 V. (B) Cycle stability of the cell II when charged at about 1.6 V to about 4 mAh/cm$^2$ and then discharged at about 10 mA/cm$^2$ to about 0.5 V. (C) Schematic and digital photograph of a membrane-free cylindrical Mn—H cell. (D) Discharge behavior of the cylindrical cell with cathode carbon felt thickness of about 6.35 mm and area of about 10 cm$^2$. The cell was charged at about 1.8 V to capacities of about 10, about 15 and about 20 mAh, and discharged at about 20 mA to 0 V. (E) Cycle stability of the cylindrical cell with a charge capacity of about 15 mAh. The electrolyte is about 1 M MnSO$_4$ with about 0.05 M H$_2$SO$_4$.
Figure 32:
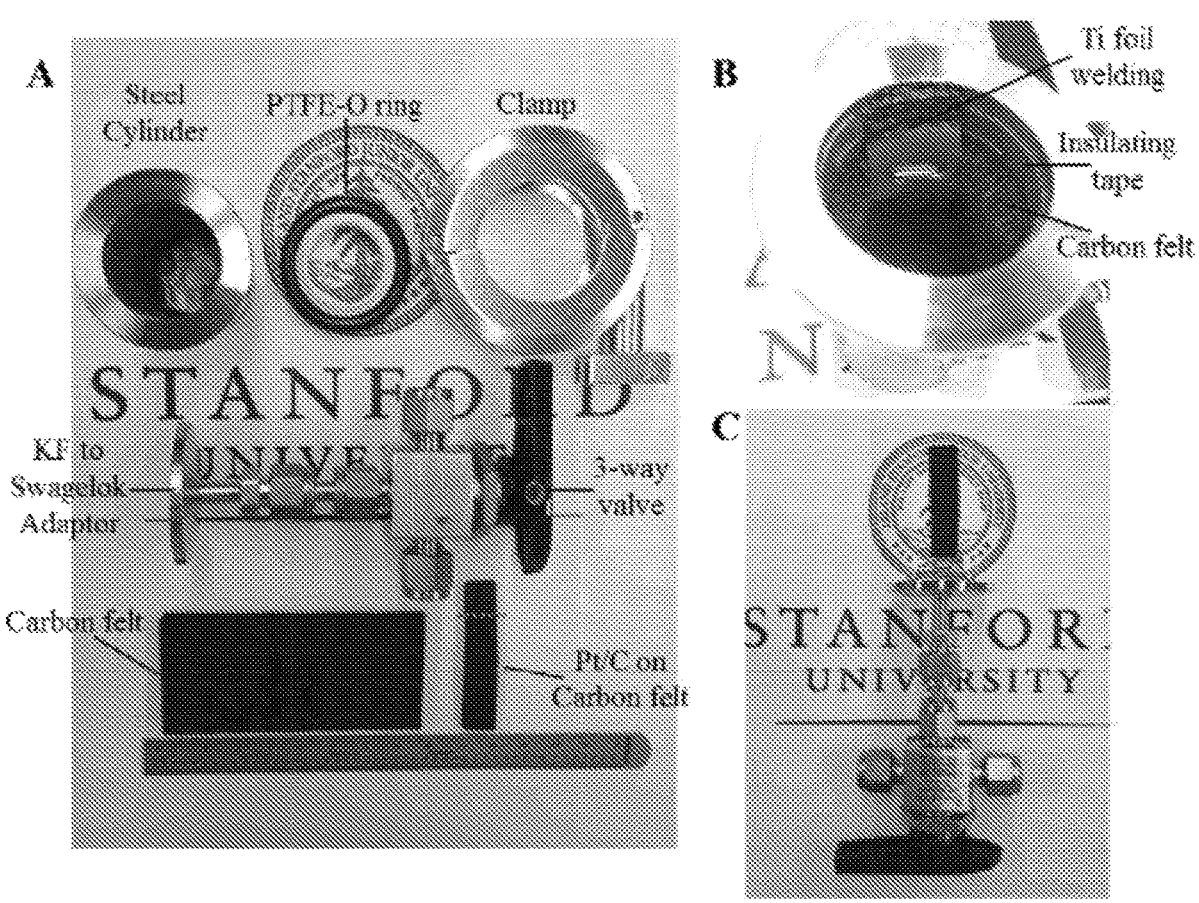
FIG. 32. Setup of a cylindrical cell. (A) Parts in the cylindrical cell. (B) Cathode of the cell. (C) Anode of the cell.
Figure 33:
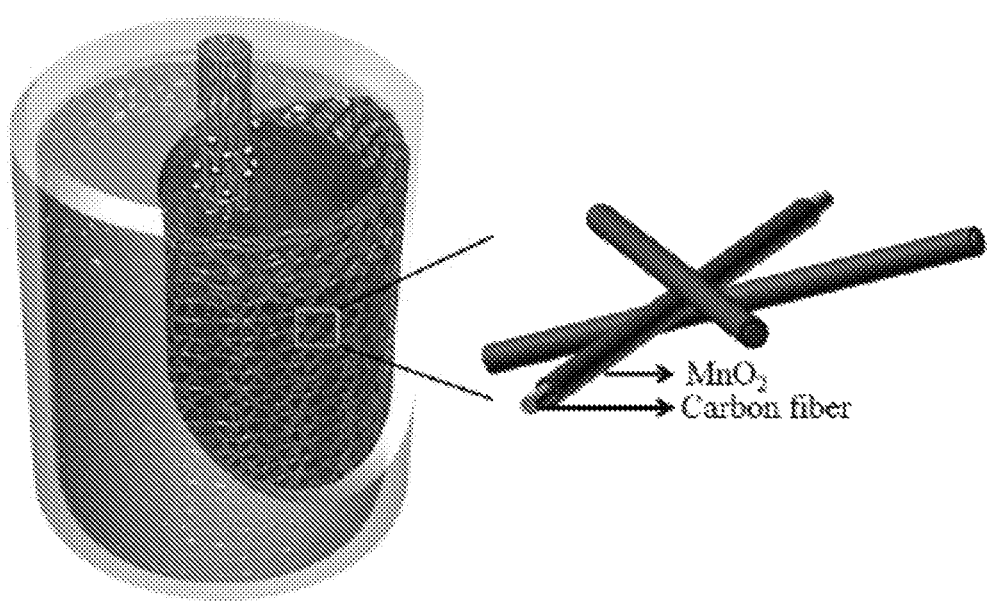
FIG. 33. Cylindrical cell in its charged state.
Figure 34:
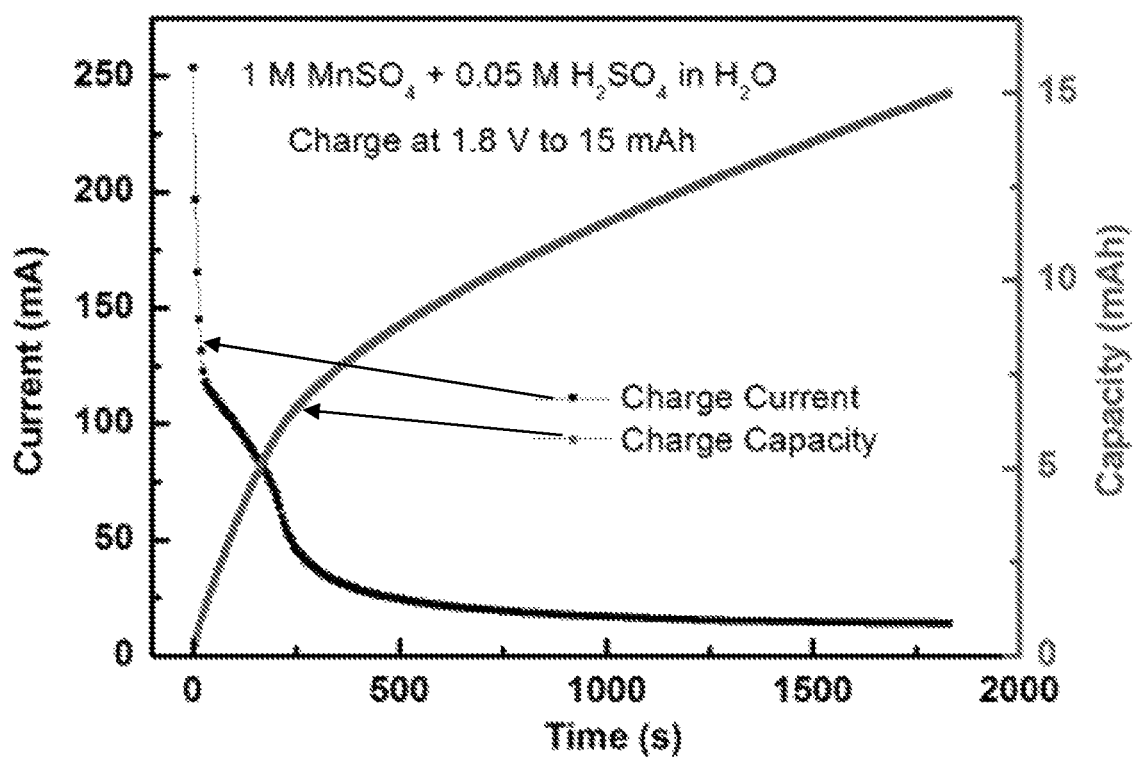
FIG. 34. Charge behavior of a cylindrical cell.

In the second approach towards the scale-up of SLGMB, a membrane-free cylindrical-type cell is formed for large-scale energy storage. The cylindrical cell is composed of a large area carbon felt cathode, electrolyte and a small piece of Pt/C coated carbon felt anode (FIG. 4C and FIG. 32). A steel vessel was utilized to encapsulate all components and keep them in hydrogen atmosphere. Owing to the unusual charge storage mechanism, it is possible to utilize non-corresponding sizes of the cathode and anode, providing an economic pathway to the fabrication of catalysis-based batteries by reducing the amount of the precious platinum catalyst at the anode. FIG. 4D shows the electrochemical discharge behavior of the cylindrical cell in an electrolyte of about 1 M MnSO$_4$ with about 0.05 M H$_2$SO$_4$. Due to the same charge storage mechanism, the cylindrical cell exhibits similar electrochemical behaviors as that of the Swagelok cells (FIG. 33). In terms of fast charge rate, it takes about half an hour to reach a capacity of about 15 mAh (FIG. 34). A discharge plateau of about 1.2 V is observed for various charge capacities in the cylindrical cell, which is slightly lower than that of the Swagelok cell. The cylindrical cell is capable of achieving high capacity of about 10-20 mAh. Specifically, the first cycle discharge capacity of the cell under charge capacity of about 10, about 15 and about 20 mAh are about 9.7, about 13.7 and about 17.6 mAh, corresponding to initial Coulombic efficiencies of about 97%, about 91.3% and about 88%, respectively. In addition, the efficiency of the cylindrical cell increases following the initial cycles, reaching about 96.7% within the first 50 cycles as revealed by the stability test (FIG. 4E). The long-term cycle stability result shows outstanding reversibility of the cylindrical cell, achieving about 94.2% of the charge capacity of about 15 mAh after 1400 cycles (FIG. 4E). To further increase the energy storage, the vessel can be enlarged by applying larger sizes of the cathode carbon felt. The excellent electrochemical performance of the cylindrical cell demonstrates another important strategy towards large-scale energy storage applications. Thus, the developed aqueous manganese batteries with solid-liquid-gas reactions provide a general methodology towards the development of high capacity, fast charging and ultrastable batteries for grid-level energy storage.

Materials and Methods:

Materials

The following chemicals and materials are commercially available and used as received: manganese sulfate (MnSO$_4$, Sigma Aldrich), sulfuric acid (H$_2$SO$_4$, Sigma Aldrich), N-methyl-2-pyrrolidone (NMP, Sigma Aldrich), platinum about 40% on carbon (HiSPEC 4000, Fuel Cell Store), polyvinylidene fluoride (PVDF, MTI), Whatman glass fiber paper (GF 8, thickness of about 350 µm), titanium foils (thickness of about 0.127 mm and about 0.5 mm, Alfa Aesar), carbon felts (thickness of about 3.18 mm and about 6.35 mm, Alfa Aesar), and de-ionized (DI) water (resistance of about 18.2 MΩ, Milli Q).

Methods

Figure 5:
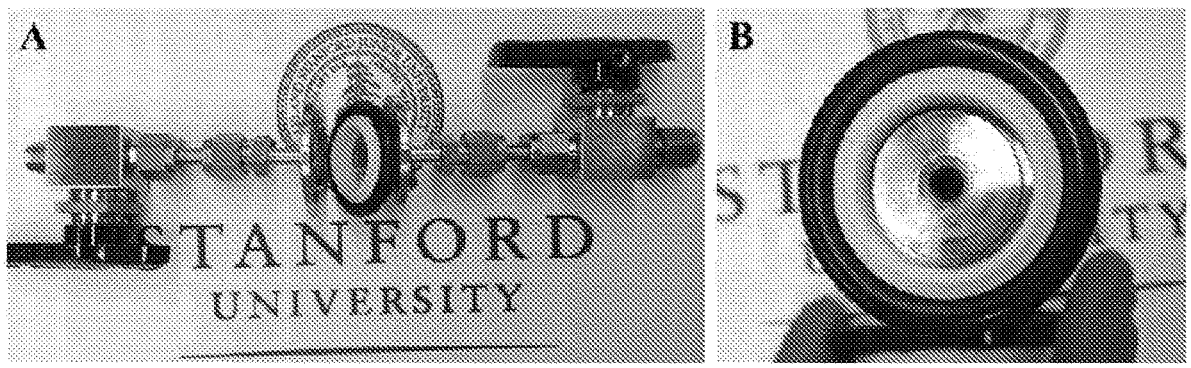
FIG. 5. Swagelok cell setup. (A) Overall view. (B) Zoomed-in view.

The Swagelok cell was constructed by connecting stainless steel inlet and outlet valves with KF flanges to Swagelok adapters in a polytetrafluoroethylene (PTFE)-centered O-ring by a clamp (FIG. 5). The cathode and anode were sandwiched by a glass fiber separator and assembled in a coin-cell stack into the Swagelok cell. A thin layer of insulating PTFE film was placed inside the aluminum clamp to isolate the cathode and anode. The cathode carbon felt was calcined at about 450° C. for about 2 h before acting as current collector. The anode was prepared by pasting Pt/C slurry onto one side of carbon felt (without calcination treatment). It was then subjected to substantially complete drying at about 60° C. under vacuum for at least about 24 h. The Pt/C slurry was prepared by mixing Pt/C power with PVDF binder in a ratio of about 9:1 in NMP and stirred vigorously for overnight. The Pt/C coated side of the anode carbon felt was directly contacted with the separator in the assembly of the Swagelok cell and its other side was employed as a gas diffusion layer. The thickness of the anode carbon felt is about 3.18 mm for all cells. High purity titanium foils were used as conductive substrates for the carbon felt current collectors, in order to avoid any possible contaminations or side reactions. The assembled cell was purged with high purity hydrogen gas (about 99.99%, Airgas) to remove the trapped air from the cell. The Swagelok cells were tested at room temperature under sealed condition by locking the valves.

The cylindrical cell was formed by clamping a stainless steel cylinder with a KF flange to Swagelok adapter in a PTFE-centered O-ring (FIG. 32). The stainless steel cylinder was machined at a machine shop and served as cathode case. The cathode was constructed by rolling the calcined carbon felt which was welded to the steel cylinder by connecting with titanium foil. The inner side of the steel cylinder was covered with a layer of insulating tape in order to avoid any contamination from the stainless steel vessel (FIG. 32B). The anode was formed by connecting a KF flange to Swagelok adapter with a three-way valve. It was accomplished by welding the Pt/C coated carbon felt with titanium foil onto the adapter (FIG. S32C). The Pt/C coated carbon felt was made by pasting Pt/C catalyst onto both sides of the carbon felt. In the assembled cylindrical cell, the cathode carbon felt was surrounded with the central anode with a gap of about 0.5 cm. About 14 mL of electrolyte (about 1 M MnSO$_4$ with about 0.05 M H$_2$SO$_4$) was added to the cell. The cell was assembled and purged with high purity hydrogen gas (about 99.99%, Airgas) to remove trapped air. The cylindrical cells were tested at room temperature under sealed condition by locking the valves.

Materials Characterization

The morphology and microstructure of the electrodes were characterized by SEM (FEI XL30 Sirion) and TEM (FEI Titan). XRD was conducted by PANalytical X'Pert diffractometer using copper K-edge X-rays. XPS was performed on SSI SProbe XPS spectrometer with Al Kα source. The average oxidation state (AOS) of $MnO_2$ is calculated on the basis of the following equation:

$$AOS=8.95-1.13\ \Delta E(eV)$$

where ΔE is the energy difference between the main Mn 3 s peak and its satellite peak.

Electrochemical Measurement

The electrochemical measurements were carried out on a Biologic VMP3 multi-channel electrochemical workstation at room temperature. Due to the unusual charge storage mechanism of the SLGMB, a chronoamperometry (e.g., substantially constant potential) technique is applied to charge the cells. An optimal potential of about 1.6 V and about 1.8 V were used to charge the Swagelok cells and cylindrical cells, respectively. The discharge of the cells was performed by applying galvanostatic currents. The Swagelok and cylindrical cells were tested in two-electrode full cell setup, where carbon felt was applied as cathode current collector while Pt/C coated carbon felt as was applied as anode current collector. A single layer of glass fiber separator (GF-8, Whatman, thickness of about 350 μm) was used in the Swagelok cells, while no membrane was used in the cylindrical cells.

The oxygen evolution reaction (OER) test was conducted in a three-electrode setup by using $MnO_2$ coated carbon felt (thickness of about 6.35 mm) as working electrode, saturated calomel electrode (SCE) as reference electrode and graphite rod as counter electrode. The $MnO_2$ coated carbon felts with geometric area of about 1 $cm^2$ were employed as the working electrodes, without using any binder or conducting additives. The electrolyte is about 0.5 M $Na_2SO_4$. The SCE reference electrode was calibrated with respect to reversible hydrogen electrode (RHE) in $H_2$ saturated about 0.1 M KOH electrolyte, yielding a relation of E(RHE)=E (SCE)+1.01 V. Linear sweep voltammetry was recorded at about 0.5 mV/s between about 0.5 and about 2 V (vs. SCE). The reported current density is referenced to the geometric area of the $MnO_2$ coated carbon felt.

Simulation Details

The "Electrodeposition, Secondary" and "Transport of Diluted Species" physics models in COMSOL were applied to simulate the reactions and concentration variations in the electrolyte. The simulation cell was rectangular with a dimension of 250 μm×250 μm in base and the height of 350 μm corresponds to the separator thickness (FIG. 5). The initial concentration of $Mn^{2+}$ ions was set to 1 M throughout the electrolyte. The diffusion coefficient of $Mn^{2+}$ was set to $1.172\times10^{-5}$ $cm^2/s$, calculated from an ionic conductivity of 44 mS/cm using the equation of σ=μne and the Einstein relation. In the case of the charging process, the cathode was set at a constant potential of 1.6 V vs. SHE. The reaction was preceded on concentration-dependent Butler-Volmer kinetics, with an exchange current density of 8.18 A/$m^2$. The charging process was terminated after a capacity of 1 mAh/$cm^2$ was obtained, which was calculated to be done after 40 s. The cell was then subsequently discharged galvanostatically at a current density of 10 mA/$cm^2$ until capacity of 1 mAh/$cm^2$ was stripped, which lasts for 360 s.

Discussion on Simulation Results

Figure 25:
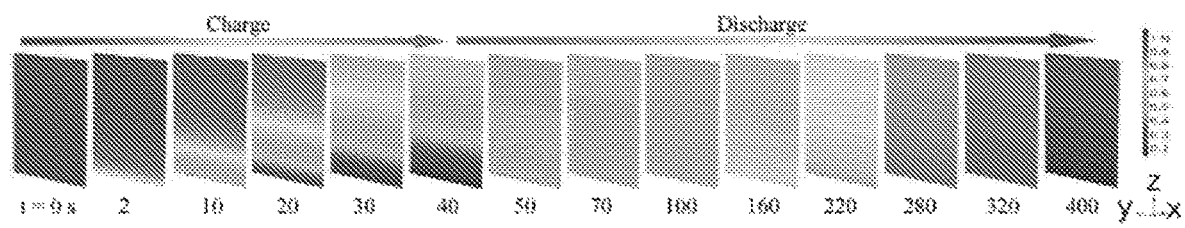
FIG. 25. Representative slices of electrolyte concentration variation over a complete charge and discharge process under charge potential of 1.6 V to capacity of 1 mAh/cm$^2$ and discharge current density of 10 mA/cm$^2$. Numbers below each slice indicate a charge or discharge time in seconds.

The simulated color spectra (FIGS. 23, 24 and 25) and their corresponding electrolyte concentration distribution curves (FIG. 26) represent gradual variation of the electrolyte concentration. Specifically, when charging the cell at 1.6 V for 2 s, the electrolyte concentration at the cathode drops drastically from 1 M to about 0.7 M, indicating that $MnO_2$ can be readily deposited on the cathode upon the applied bias, while the electrolyte concentration at the anode remains unchanged. When the cell is charged for 10 s, the electrolyte concentration at the cathode drops further to 0.45 M; meanwhile the concentration at the anode starts to decrease. Further charging the cell for 40 s to capacity of 1 mAh/$cm^2$ results in the depletion of the electrolyte at the cathode (about 0.16 M) and significant decrease of the electrolyte concentration at the anode (about 0.68 M). The electrolyte concentration variation of the subsequent cell discharge at current density of 10 mA/$cm^2$ shows distinct reversible behaviors to the charge process due to the different charge and discharge techniques applied in this simulation. As a result, the electrolyte concentration at the cell cathode promptly increases within the first few seconds and then gradually ramps up to nearly 1 M when fully discharged, indicating that the deposited $MnO_2$ on the cathode is dissolved back to the electrolyte accordingly. However, the electrolyte concentration at the anode decreases to about 0.5 M at discharge time of 60 s and then increases steadily to nearly 1 M with further discharge until fully discharged at 400 s. The electrolyte concentration distribution after fully discharge and relaxation (FIG. 26B, 400 s) tends to become exactly the same as that of the cell before charging (FIG. 26A, 0 s), which is confirmed by their same color spectra of the electrolyte concentration (FIG. 25, 0 s and 400 s). This indicates that the concentration variation of electrolyte can be fully recovered after a complete charge and discharge cycle, demonstrating the highly reversible charge and discharge process of the $MnO_2$ deposition-dissolution reactions on the carbon felt cathode. Moreover, the charge process is fast, which takes just 40 s to achieve a capacity of 1 mAh/$cm^2$ (FIG. 27). These excellent properties are of significance to the development of manganese batteries with good reversibility and fast charging rates.

As used herein, the singular terms "a," "an," and "the" may include plural referents unless the context clearly dictates otherwise. Thus, for example, reference to an object may include multiple objects unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the term "size" refers to a characteristic dimension of an object. Thus, for example, a size of an object that is circular or spherical can refer to a diameter of the object. In the case of an object that is non-circular or non-spherical, a size of the object can refer to a diameter of a corresponding circular or spherical object, where the corresponding circular or spherical object exhibits or has a particular set of derivable or measurable characteristics that are substantially the same as those of the non-circular or non-spherical object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations are not a limitation of this disclosure.

What is claimed is:

1. A rechargeable manganese battery comprising:
   a first electrode including a porous, conductive support;
   a second electrode including a catalyst support and a catalyst disposed over the catalyst support; and
   an electrolyte disposed between the first electrode and the second electrode to support reversible precipitation and dissolution of manganese at the first electrode and reversible evolution and oxidation of hydrogen at the second electrode,
   wherein the rechargeable manganese battery is configured such that during a charge operation of the rechargeable manganese battery, a nanostructured manganese oxide is deposited on a surface of the porous, conductive support of the first electrode.

2. The rechargeable manganese battery of claim 1, wherein the porous, conductive support is a carbonaceous fibrous support.

3. The rechargeable manganese battery of claim 1, wherein the catalyst support is a carbonaceous fibrous support.

4. The rechargeable manganese battery of claim 1, wherein the catalyst includes one or more platinum group metals.

5. The rechargeable manganese battery of claim 1, wherein the electrolyte includes manganese ions.

6. The rechargeable manganese battery of claim 5, wherein the manganese ions include $Mn^{2+}$.

7. The rechargeable manganese battery of claim 5, wherein a concentration of the manganese ions is in a range of 0.1 M to 7 M.

8. The rechargeable manganese battery of claim 5, wherein the electrolyte is an aqueous electrolyte.

9. The rechargeable manganese battery of claim 8, wherein the aqueous electrolyte has a pH below 7.

10. The rechargeable manganese battery of claim 5, wherein the electrolyte is a non-aqueous electrolyte.

11. A rechargeable manganese battery comprising:
    a cathode including a porous, conductive support;
    an anode including a catalyst support and a catalyst disposed over the catalyst support; and
    an electrolyte disposed between the cathode and the anode and including manganese ions,
    wherein the rechargeable manganese battery is configured such that during a charge operation of the rechargeable manganese battery, a nanostructured manganese oxide is deposited on a surface of the porous, conductive support of the cathode.

12. The rechargeable manganese battery of claim 11, wherein the manganese ions include $Mn^{2+}$.

13. The rechargeable manganese battery of claim 11, wherein a concentration of the manganese ions is in a range of 0.1 M to 7 M.

14. The rechargeable manganese battery of claim 11, wherein the electrolyte is acidic.

15. A method of operating a rechargeable manganese battery, comprising:
    providing a first electrode including a porous, conductive support;
    providing a second electrode including a catalyst support and a catalyst coated over the catalyst support;
    providing an electrolyte to support reversible precipitation and dissolution of manganese at the first electrode and reversible evolution and oxidation of hydrogen at the second electrode,
    during a charge operation of the rechargeable manganese battery, forming a nanostructured manganese oxide on a surface of the porous, conductive support of the first electrode.

16. The method of claim 15, wherein the nanostructured manganese oxide includes gamma manganese oxide.

17. The method of claim 15, wherein the nanostructured manganese oxide comprises nanosheets of manganese oxide.

* * * * *